(12) United States Patent
Zhang et al.

(10) Patent No.: US 12,047,307 B2
(45) Date of Patent: Jul. 23, 2024

(54) WIRELESS COMMUNICATION METHOD AND DEVICE THAT SUPPORT DATA TRANSMISSION ON UNLICENSED SPECTRUM

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/986,916

(22) Filed: Nov. 15, 2022

(65) Prior Publication Data

US 2023/0074940 A1   Mar. 9, 2023

Related U.S. Application Data

(63) Continuation of application No. 17/016,401, filed on Sep. 10, 2020, now Pat. No. 11,533,139, which is a
(Continued)

(51) Int. Cl.
*H04W 4/00* (2018.01)
*H04L 5/00* (2006.01)
(Continued)

(52) U.S. Cl.
CPC ............ *H04L 5/0007* (2013.01); *H04L 5/003* (2013.01); *H04W 72/0446* (2013.01); *H04W 72/0453* (2013.01)

(58) Field of Classification Search
CPC .. H04L 5/0007; H04L 5/003; H04W 72/0446; H04W 72/0453
See application file for complete search history.

(56) References Cited

U.S. PATENT DOCUMENTS

| 11,206,666 B2 * | 12/2021 | Wu ........................ H04L 5/0094 |
| 2015/0055618 A1 | 2/2015 | Takaoka |

(Continued)

FOREIGN PATENT DOCUMENTS

| CN | 106455087 A | 2/2017 |
| CN | 107852752 A | 3/2018 |

(Continued)

OTHER PUBLICATIONS

ISR in application PCT/CN2018/088675 dated Nov. 22, 2018.
(Continued)

*Primary Examiner* — Abdelnabi O Musa

(57) ABSTRACT

A method and a device in a User Equipment (UE) and a base station for wireless communications are disclosed by the present disclosure. A first node receives T first-type radio signals; performs T access detections respectively on T sub-bands and transmits T second-type radio signals respectively in T time-frequency resource blocks; and performs Q energy detection(s) respectively in Q time sub-pool(s) on a first sub-band, through which Q detection value(s) is(are) obtained. The T sub-bands each comprise at least one same frequency point, or the T sub-bands belong to a same carrier; at least one of the T sub-bands is different from the first sub-band; the selection of the reference time-frequency resource block is related to at least one between the first sub-band and the reference sub-band; the first node is a base station, or the first node is a UE.

20 Claims, 18 Drawing Sheets

Related U.S. Application Data continuation of application No. PCT/CN2018/088675, filed on May 28, 2018.

(51) Int. Cl.
    *H04W 72/0446*     (2023.01)
    *H04W 72/0453*     (2023.01)

(56) References Cited

U.S. PATENT DOCUMENTS

| | | | |
|---|---|---|---|
| 2019/0029044 A1 | 1/2019 | Hu | |
| 2020/0083935 A1* | 3/2020 | Wu | H04W 72/02 |
| 2020/0145966 A1* | 5/2020 | Jiang | H04L 5/0053 |
| 2020/0275440 A1* | 8/2020 | Wu | H04W 72/23 |
| 2020/0366432 A1* | 11/2020 | Wu | H04L 5/0094 |
| 2020/0412504 A1* | 12/2020 | Wu | H04B 7/08 |
| 2021/0029673 A1* | 1/2021 | Zhang | H04L 5/0044 |
| 2021/0067293 A1* | 3/2021 | Wu | H04L 5/0005 |
| 2021/0152281 A1* | 5/2021 | Wu | H04L 5/0094 |
| 2021/0274524 A1* | 9/2021 | Liu | H04L 1/0041 |
| 2021/0329612 A1* | 10/2021 | Zhang | H04L 1/0009 |
| 2021/0329649 A1* | 10/2021 | Wu | H04L 5/0044 |

FOREIGN PATENT DOCUMENTS

| | | |
|---|---|---|
| CN | 107872847 A | 4/2018 |
| WO | 2017167165 A1 | 10/2017 |
| WO | 2018029659 A1 | 2/2018 |

OTHER PUBLICATIONS

The extended Indian search report in application 202017054693 dated Dec. 21, 2021.
The extended European search report in application 18921068.5 dated May 25, 2021.

* cited by examiner

Z sub-signal(s):

| | #0 | #1 | ... | #Z-2 | #Z-1 |
|---|---|---|---|---|---|
| | comprising new data | not comprising new data | ... | not comprising new data | comprising new data |

First value = a number of sub-signal(s) comprising new data out of Z sub-signal(s)

FIG. 11A

Z sub-signal(s):

| | #0 | #1 | ... | #Z-2 | #Z-1 |
|---|---|---|---|---|---|
| | comprising new data | not comprising new data | ... | not comprising new data | comprising new data |

$$\text{First value} = \frac{\text{A number of sub-signal(s) comprising new data out of Z sub-signal(s)}}{Z}$$

FIG. 11B

J second statistical value(s):

| | #0 | #1 | ... | #J-2 | #J-1 |
|---|---|---|---|---|---|
| | comprising new data | not comprising new data | ... | not comprising new data | comprising new data |

First value = a number of second statistical value(s) comprising new data out of J second statistical value(s)

FIG. 11C

J second statistical value(s)

| #0 | #1 | ... | #J-2 | #J-1 |
|---|---|---|---|---|
| comprising new data | not comprising new data | ... | not comprising new data | comprising new data |

$$\text{First value} = \frac{\text{a number of second statistical value(s) comprising new data out of J second statistical value(s)}}{J}$$

FIG. 11D

First integer set      {15, 31, 63}
                             |   |
                            K0  K1

$$K = \begin{cases} K1, & \text{given ratio} \geq \text{first target value} \\ 15, & \text{given ratio} < \text{first target value} \end{cases}$$

FIG. 13

First integer set {15, 31, 63}
                        |
                       K0=K1

$$K = \begin{cases} K0, & \text{given value} \leq \text{second target value} \\ 15, & \text{given value} > \text{second target value} \end{cases}$$

FIG. 14

WIRELESS COMMUNICATION METHOD AND DEVICE THAT SUPPORT DATA TRANSMISSION ON UNLICENSED SPECTRUM

CROSS REFERENCE TO RELATED APPLICATIONS

This application is a continuation of the U.S. patent application Ser. No. 17/016,401, filed on Sep. 10, 2020, which is a continuation of International Application No. PCT/CN2018/088675, filed May 28, 2018, the full disclosure of which is incorporated herein by reference.

BACKGROUND

Technical Field

The present disclosure relates to transmission methods and devices in wireless communication systems, and in particular to a communication method and device that support data transmission on Unlicensed Spectrum.

Related Art

In a traditional $3^{rd}$ Generation Partner Project (3GPP) Long-term Evolution (LTE) system, data transmission only occurs on Licensed Spectrum. However, as traffic flow began to skyrocket, particularly in some urban areas, the Licensed Spectrum may hardly meet growing demands for traffic, therefore, in Release 13 and Release 14 communications on Unlicensed Spectrum is introduced into a cellular system and used for downlink and uplink data transmissions. To ensure compatibility with other access technologies on Unlicensed Spectrum, the technique of Listen Before Talk (LBT) is adopted by Licensed Assisted Access (LAA) so as to prevent interference caused by multiple transmitters occupying a same frequency resource at the same time.

In the Cat 4 LBT (refer to 3GPP TR36.889 for the meaning of Cat 4 LBT) process of LTE, a transmitter (i.e., a base station or a User Equipment) experiences backoff in a certain defer duration, in which the backoff time is calculated based on a measurement unit of Clear Channel Assessment (CCA) slot duration, and the number of slot durations of the backoff is obtained by random selection of the transmitter within a contention window size (CWS). For a downlink (DL) transmission, the CWS is adjusted according to a Hybrid Automatic Repeat Request (HARQ) feedback corresponding to data comprised in a reference subframe previously transmitted on the Unlicensed Spectrum. For an uplink (UL) transmission, the CWS is adjusted according to whether data comprised by a reference subframe previously transmitted on the Unlicensed Spectrum comprises new data. In LTE, a bandwidth of LBT is the same as that of a corresponding carrier.

Considering that the receiving bandwidth at the terminal may be restricted, a concept of Bandwidth Part (BWP) is introduced in 5G NR (New Radio Access Technology) Phase 1 system, with a view to supporting multiple subcarrier spacings (SCSs) under a single system bandwidth. Specifically, when a cell has a Component Carrier (CC) with large bandwidth, a base station is able to split the large CC into a few BWPs to suit UEs with different receiving bandwidths and transmitting bandwidth capabilities, the size of BWP can be flexibly configured. When a UE with smaller bandwidth capability is in communication with a cell, the UE is only qualified for either downlink reception or uplink transmission on a smaller BWP; when a UE with larger bandwidth capability is in communication with a cell, the UE is able to perform downlink reception or uplink transmission on a larger BWP. Currently, discussions about sub-band LBT in 5G NR are still under way, since the variety range of NR system bandwidth is wider than that of LTE system bandwidth, traditional LAA techniques shall be reconsidered, such as the LBT scheme.

SUMMARY

Inventors find through researches that how to enhance the chance of channel access on Unlicensed Spectrum in an NR system to achieve multiple transmitting nodes' sharing of Unlicensed Spectrum resources in a more effective manner is a key issue that remains to be handled.

To address the above problem, the present disclosure provides a solution. It should be noted that the embodiments of the present disclosure and the characteristics in the embodiments may be mutually combined if no conflict is incurred.

The present disclosure provides a method in a first node for wireless communications, comprising:
receiving T first-type radio signals, T being a positive integer greater than 1; and performing T access detections respectively on T sub-bands, and transmitting T second-type radio signals respectively in T time-frequency resource blocks; and
performing Q energy detection(s) respectively in Q time sub-pool(s) on a first sub-band, through which Q detection value(s) is(are) obtained, Q being a positive integer;
herein, the T sub-bands comprise at least one same frequency point, or the T sub-bands belong to a same carrier; at least one sub-band of the T sub-bands is different from the first sub-band; the T first-type radio signals are respectively associated with the T second-type radio signals; a reference first-type radio signal is one of the T first-type radio signals, the Q is related only to the reference first-type radio signal of the T first-type radio signals; the T access detections are respectively used for determining transmissions of the T second-type radio signals; a reference sub-band is one of the T sub-bands corresponding to the reference first-type radio signal, and a reference time-frequency resource block is one of the T time-frequency resource blocks corresponding to the reference first-type radio signal; selection of the reference time-frequency resource block is related to at least one of the first sub-band or the reference sub-band; the first node is a base station, or the first node is a User Equipment (UE).

In one embodiment, a problem to be solved in the present disclosure is that when a CC bandwidth or a BWP bandwidth is larger, and a bandwidth of LBT is the same as the CC/BWP bandwidth, the larger LBT bandwidth will lead to lower chance of channel access. To enhance the chance of access to channel and to achieve multiple transmitting nodes' sharing of Unlicensed Spectrum resources more effectively, a narrowband LBT (that is, having a bandwidth smaller than CC or BWP, or, an LBT bandwidth smaller than a transmission bandwidth of a radio signal), whose bandwidth shall be no smaller than specified by regulatory requirements (for example, a bandwidth of 20 MHz with a carrier frequency of 5 GHz, or a bandwidth of 1 GHz with a carrier frequency of 60 GHz) can be employed to enhance the chance of channel access, therefore, wireless transmissions under narrowband LBT is a key issue to be solved.

In one embodiment, a problem to be solved in the present disclosure is that when employing the technique of narrowband LBT, the LBT bandwidth for a transmitting node may vary at different times, and a reference subframe needs to be determined in calculating CWS for the present LBT, and the determination of the reference subframe has to reflect the interference on the present LBT bandwidth, thus posing another requirement on the CWS adjustment. The above proposal manages to solve the problem by taking into account the present LBT bandwidth and/or a previous LBT bandwidth when determining a reference subframe, thereby decreasing the chance of multiple transmitters' occupying the same frequency resources, hence a reduction in co-channel interference caused therefrom.

In one embodiment, the essence of the above method lies in that the T access detections are T LBTs respectively, and the T sub-bands are bandwidths of the T LBTs respectively. The first sub-band is a bandwidth of the current LBT, and the reference time-frequency resource block is a reference subframe, the Q being related to CWS, and the selection of a reference subframe is related to a bandwidth of the current LBT and/or bandwidths of T LBTs. An advantage of employing the above method is to enable the CWS to reflect the interference situation on the current LT bandwidth more accurately, thereby configuring an optimal backoff contention window for the Q energy detection(s).

According to one aspect of the present disclosure, the above method is characterized in that a bandwidth of the reference sub-band is equal to a bandwidth of a carrier to which the reference sub-band belongs.

In one embodiment, the essence of the above method lies in that a reference sub-band is wideband, so LBT corresponding to the reference sub-band is wideband LBT, which means that the present frequency band for LBT will never exceed the coverage of the reference sub-band. An advantage of the above method is that no matter what size the present LBT bandwidth is, selecting time-frequency resources in uplink/downlink burst corresponding to the wideband LBT as a reference subframe helps reflect how exactly the current LBT is interfered, thereby configuring an optimal backoff contention window for the Q energy detection(s).

According to one aspect of the present disclosure, the above method is characterized in that each of t time-frequency resource block(s) out of the T time-frequency resource blocks comprises the first sub-band, t being a positive integer no greater than the T; the reference time-frequency resource block is one of the t time-frequency resource block(s).

In one embodiment, the essence of the above method lies in that each frequency band(s) of t LBT(s) respectively corresponding to the t time-frequency resource block(s) comprises a frequency band of the present LBT, and a reference subframe corresponds to one of the t time-frequency resource block(s), for instance, a time-frequency resource block nearest to the present LBT chronologically. An advantage of the above method is that the reference subframe can reflect the interference situation in the present LBT, thereby configuring an optimal backoff contention window for the Q energy detection(s).

According to one aspect of the present disclosure, the above method is characterized in that each of t time-frequency resource block(s) out of the T time-frequency resource blocks comprises the first sub-band, t being a positive integer no greater than the T; frequency-domain resources respectively comprised by t1 time-frequency resource block(s) of the t time-frequency resource block(s) are the same as frequency-domain resources comprised by the first sub-band, wherein t1 is a positive integer no greater than the t, and the reference time-frequency resource block is one of the t1 time-frequency resource block(s); or, frequency-domain resources comprised by any of the t time-frequency resource block(s) are not completely the same as frequency-domain resources comprised by the first sub-band, and the reference time-frequency resource block is one of the t time-frequency resource block(s).

In one embodiment, the essence of the above method lies in that if frequency band(s) of t1 LBT(s) respectively corresponding to the t1 time-frequency resource block(s) of the t time-frequency resource block(s) is(are) the same as a frequency band of the present LBT, a reference subframe corresponds to one of the t1 time-frequency resource block(s), for instance, a time-frequency resource block nearest to the present LBT chronologically; otherwise, if band range of each LBT of t LBT(s) respectively corresponding to the t time-frequency resource block(s) is larger than that of the present LBT, a reference subframe corresponds to one of the t time-frequency resource block(s), for instance, a time-frequency resource block nearest to the present LBT chronologically. An advantage of the above method is that by prioritizing the reference subframe as a correspondence to time-frequency resources corresponding to an LBT having the same frequency band as the current LBT, the interference situation in the present LBT can be reflected more clearly, thereby configuring an optimal backoff contention window for the Q energy detection(s).

According to one aspect of the present disclosure, the above method is characterized in that the first node is a base station, and the T first-type radio signals respectively indicate whether the T second-type radio signals are correctly received; a reference second-type radio signal is one of the T second-type radio signals associated with the reference first-type radio signal, and the reference second-type radio signal comprises W sub-signal(s), W being a positive integer; whether the W sub-signal(s) is(are) correctly received is used for determining the Q.

According to one aspect of the present disclosure, the above method is characterized in that the first node is a UE, and the T first-type radio signals respectively comprise scheduling information of the T second-type radio signals; a reference second-type radio signal is one of the T second-type radio signals associated with the reference first-type radio signal, and the reference second-type radio signal comprises V sub-signal(s), V being a positive integer; the reference first-type radio signal is used for respectively determining whether the V sub-signal(s) comprises(comprise) new data; whether the V sub-signal(s) comprises (comprise) new data is used for determining the Q.

According to one aspect of the present disclosure, the above method is characterized in that the reference first-type radio signal is used for determining K candidate integer(s), Q1 being one of the K candidate integer(s); each of Q1 detection value(s) out of the Q detection value(s) is lower than a first threshold, K being a positive integer, and the Q1 being a positive integer no greater than the Q.

According to one aspect of the present disclosure, the above method is characterized in comprising:
transmitting a third-type radio signal in the first sub-band;
herein, a start time of time-domain resources occupied by the third-type radio signal is no earlier than an end time of the Q time sub-pool(s).

According to one aspect of the present disclosure, the above method is characterized in comprising:
operating first information;
herein, the first information comprises scheduling information of the third-type radio signal; the operating is receiving, and the first node is a UE; or the operating is transmitting, and the first node is a base station.

The present disclosure provides a device in a first node for wireless communications, comprising:

a first transceiver, receiving T first-type radio signals, T being a positive integer greater than 1; and performing T access detections respectively on T sub-bands, and transmitting T second-type radio signals respectively in T time-frequency resource blocks; and a first receiver, performing Q energy detection(s) respectively in Q time sub-pool(s) on a first sub-band, through which Q detection value(s) is(are) obtained, Q being a positive integer;

herein, the T sub-bands comprise at least one same frequency point, or the T sub-bands belong to a same carrier; at least one sub-band of the T sub-bands is different from the first sub-band; the T first-type radio signals are respectively associated with the T second-type radio signals; a reference first-type radio signal is one of the T first-type radio signals, the Q is related only to the reference first-type radio signal of the T first-type radio signals; the T access detections are respectively used for determining transmissions of the T second-type radio signals; a reference sub-band is one of the T sub-bands corresponding to the reference first-type radio signal, and a reference time-frequency resource block is one of the T time-frequency resource blocks corresponding to the reference first-type radio signal; selection of the reference time-frequency resource block is related to at least one of the first sub-band or the reference sub-band; the first node is a base station, or the first node is a User Equipment (UE).

In one embodiment, the above device in the first node is characterized in that a bandwidth of the reference sub-band is equal to a bandwidth of a carrier to which the reference sub-band belongs.

In one embodiment, the above device in the first node is characterized in that each of t time-frequency resource block(s) out of the T time-frequency resource blocks comprises the first sub-band, t being a positive integer no greater than the T; the reference time-frequency resource block is one of the t time-frequency resource block(s).

In one embodiment, the above device in the first node is characterized in that each of t time-frequency resource block(s) out of the T time-frequency resource blocks comprises the first sub-band, t being a positive integer no greater than the T; frequency-domain resources respectively comprised by t1 time-frequency resource block(s) of the t time-frequency resource block(s) are the same as frequency-domain resources comprised by the first sub-band, wherein t1 is a positive integer no greater than the t, and the reference time-frequency resource block is one of the t1 time-frequency resource block(s); or, frequency-domain resources comprised by any of the t time-frequency resource block(s) are not completely the same as frequency-domain resources comprised by the first sub-band, and the reference time-frequency resource block is one of the t time-frequency resource block(s).

In one embodiment, the above device in the first node is characterized in that the first node is a base station, and the T first-type radio signals respectively indicate whether the T second-type radio signals are correctly received; a reference second-type radio signal is one of the T second-type radio signals associated with the reference first-type radio signal, and the reference second-type radio signal comprises W sub-signal(s), W being a positive integer; whether the W sub-signal(s) is(are) correctly received is used for determining the Q.

In one embodiment, the above device in the first node is characterized in that the first node is a UE, and the T first-type radio signals respectively comprise scheduling information of the T second-type radio signals; a reference second-type radio signal is one of the T second-type radio signals associated with the reference first-type radio signal, and the reference second-type radio signal comprises V sub-signal(s), V being a positive integer; the reference first-type radio signal is used for respectively determining whether the V sub-signal(s) comprises(comprise) new data; whether the V sub-signal(s) comprises(comprise) new data is used for determining the Q.

In one embodiment, the above device in the first node is characterized in that the reference first-type radio signal is used for determining K candidate integer(s), Q1 being one of the K candidate integer(s); each of Q1 detection value(s) out of the Q detection value(s) is lower than a first threshold, K being a positive integer, and the Q1 being a positive integer no greater than the Q.

In one embodiment, the above device in the first node is characterized in comprising:

a first transmitter, transmitting a third-type radio signal in the first sub-band;

herein, a start time of time-domain resources occupied by the third-type radio signal is no earlier than an end time of the Q time sub-pool(s).

In one embodiment, the above device in the first node is characterized in that the first transceiver also operates first information; herein, the first information comprises scheduling information of the third-type radio signal; the operating is receiving, and the first node is a UE; or the operating is transmitting, and the first node is a base station.

In one embodiment, the present disclosure has the following advantages over the prior art:

When a bandwidth of CC or BWP is larger and is the same as that of LBT, the larger LBT bandwidth will result in lower chance of channel access. To enhance the chance of channel access, which further contributes to the sharing of Unlicensed Spectrum resources by multiple transmitting nodes, when the required bandwidth is no smaller than that specified by regulations, such as 20 MHz with a carrier frequency of 5 GHz and 1 GHz with a carrier frequency of 60 GHz, a narrowband LBT (that is, having a bandwidth smaller than CC or BWP, or a LBT bandwidth smaller than a transmission bandwidth of a radio signal) is allowed to be applied to enhance the chance of access to the channel.

In the application of narrowband LBT technique, a transmitting node may have different LBT bandwidths as time changes. A reference subframe needs to be determined before the calculation of CWS for the current LBT. It is proposed in the present disclosure that the current LBT bandwidth and/or a previous LBT bandwidth should be considered for the determination of the reference subframe, so as to ensure that the reference subframe precisely reflects the interference situation on the current LBT bandwidth, and that a most suitable backoff contention window can be configured, thus reducing the chance of multiple transmitters' occupying the same frequency resources simultaneously and co-channel interference that may arise therefrom.

BRIEF DESCRIPTION OF THE DRAWINGS

Other features, objects and advantages of the present disclosure will become more apparent from the detailed description of non-restrictive embodiments taken in conjunction with the following drawings:

FIG. 11A-FIG. 11D respectively illustrate a schematic diagram of relations among J given third radio signal(s), J given fourth radio signal(s) and Q according to another embodiment of the present disclosure.

FIG. 13 illustrates a schematic diagram of J given fifth radio signal(s) being used for determining K candidate integer(s) according to one embodiment of the present disclosure.

FIG. 14 illustrates a schematic diagram of J given sixth radio signal(s) being used for determining K candidate integer(s) according to another embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
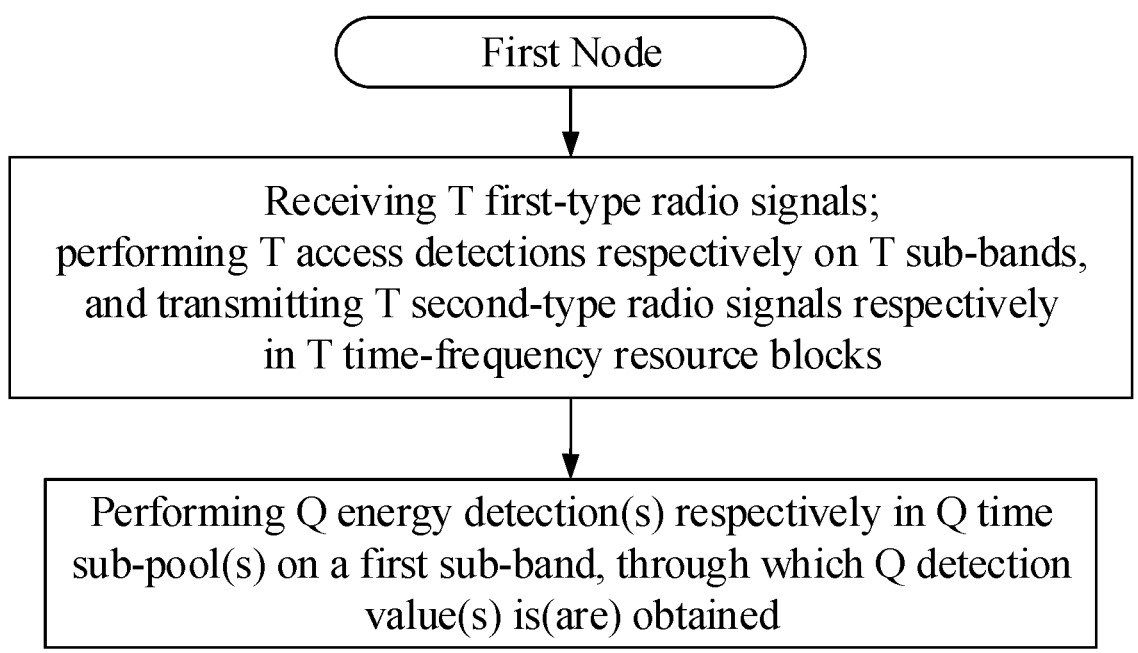
FIG. 1 illustrates a flowchart of T first-type radio signals, T access detections, T second-type radio signals and Q energy detection(s) according to one embodiment of the present disclosure.

Embodiment 1 illustrates a flowchart of T first-type radio signals, T access detections, T second-type radio signals and Q energy detection(s), as shown in FIG. 1.

In Embodiment 1, the first node in the present disclosure receives T first-type radio signals, T being a positive integer greater than 1; performs T access detections respectively on T sub-bands, and transmits T second-type radio signals respectively in T time-frequency resource blocks; and performs Q energy detection(s) respectively in Q time sub-pool(s) on a first sub-band, through which Q detection value(s) is(are) obtained, Q being a positive integer; herein, the T sub-bands comprise at least one same frequency point, or the T sub-bands belong to a same carrier; at least one sub-band of the T sub-bands is different from the first sub-band; the T first-type radio signals are respectively associated with the T second-type radio signals; a reference first-type radio signal is one of the T first-type radio signals, the Q is related only to the reference first-type radio signal of the T first-type radio signals; the T access detections are respectively used for determining transmissions of the T second-type radio signals; a reference sub-band is one of the T sub-bands corresponding to the reference first-type radio signal, and a reference time-frequency resource block is one of the T time-frequency resource blocks corresponding to the reference first-type radio signal; selection of the reference time-frequency resource block is related to at least one of the first sub-band or the reference sub-band; the first node is a base station, or the first node is a UE.

In one embodiment, any first-type radio signal of the T first-type radio signals comprises control information.

In one embodiment, the T first-type radio signals are respectively transmitted in the T sub-bands.

In one embodiment, any first-type radio signal of the T first-type radio signals is transmitted in one of the T sub-bands.

In one embodiment, at least one first-type radio signal of the T first-type radio signals is transmitted in one of the T sub-bands.

In one embodiment, at least one first-type radio signal of the T first-type radio signals is transmitted in a frequency band other than the T sub-bands.

In one embodiment, the T first-type radio signals are transmitted in (a) frequency band(s) other than the T sub-bands.

In one embodiment, the T first-type radio signals are transmitted in a carrier to which the T sub-bands belong.

In one embodiment, the T first-type radio signals are transmitted in a carrier different from a carrier to which the T sub-bands belong.

In one embodiment, the T first-type radio signals are transmitted in a frequency band deployed on Licensed Spectrum.

In one embodiment, the T first-type radio signals are transmitted in a frequency band deployed on Unlicensed Spectrum.

In one embodiment, any second-type radio signal of the T second-type radio signals comprises data.

In one embodiment, any second-type radio signal of the T second-type radio signals comprises a reference signal.

In one embodiment, any second-type radio signal of the T second-type radio signals comprises data and a reference signal.

In one embodiment, the T second-type radio signals are composed of data and reference signals.

In one embodiment, the T second-type radio signals are respectively transmitted in the T sub-bands.

In one embodiment, the T second-type radio signals are transmitted in a frequency band deployed on Unlicensed Spectrum.

In one embodiment, time-domain resources respectively occupied by the T second-type radio signals are mutually orthogonal (that is, non-overlapping).

In one embodiment, time-domain resources respectively occupied by at least two of the T second-type radio signals are mutually orthogonal (that is, non-overlapping).

In one embodiment, there does not exist any multicarrier symbol belonging to any two second-type radio signals of the T second-type radio signals.

In one embodiment, there does not exist any multicarrier symbol belonging to at least two second-type radio signals of the T second-type radio signals.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises Cyclic Prefix (CP).

In one embodiment, the T sub-bands are deployed on Unlicensed Spectrum.

In one embodiment, the T sub-bands are T Bandwidth Parts (BWPs) respectively.

In one embodiment, each of the T sub-bands comprises a positive integer number of Physical Resource Block(s) (PRB) in frequency domain.

In one embodiment, each of the T sub-bands comprises a positive integer number of consecutive PRBs in frequency domain.

In one embodiment, each of the T sub-bands comprises a positive integer number of Resource Block(s) (RB) in frequency domain.

In one embodiment, each of the T sub-bands comprises a positive integer number of consecutive RBs in frequency domain.

In one embodiment, each of the T sub-bands comprises a positive integer number of consecutive subcarriers in frequency domain.

In one embodiment, the T sub-bands comprise at least one same frequency point.

In one subembodiment of the above embodiment, the T sub-bands comprise at least one same subcarrier.

In one subembodiment of the above embodiment, any two of the T sub-bands are non-orthogonal (i.e., overlapping).

In one subembodiment of the above embodiment, the T sub-bands comprise at least a same frequency-domain resource.

In one embodiment, the T sub-bands belong to a same carrier.

In one subembodiment of the above embodiment, at least two of the T sub-bands are orthogonal (i.e., non-overlapping).

In one subembodiment of the above embodiment, at least two of the T sub-bands are non-orthogonal (i.e., overlapping).

In one subembodiment of the above embodiment, any two of the T sub-bands are orthogonal (i.e., non-overlapping).

In one subembodiment of the above embodiment, any two of the T sub-bands bands are non-orthogonal (i.e., overlapping).

In one subembodiment of the above embodiment, a bandwidth of any of the T sub-bands is equal to or smaller than a bandwidth of a carrier to which the T sub-bands belong.

In one embodiment, a bandwidth of any of the T sub-bands is an integral multiple of 20 MHz.

In one embodiment, any of the T sub-bands has a bandwidth of 20 MHz.

In one embodiment, any of the T sub-bands has a bandwidth of 1 GHz.

In one embodiment, any of the T sub-bands has a bandwidth of x1 MHz, x1 being a positive integer.

In one embodiment, any of the T sub-bands has a bandwidth of x2 GHz, x2 being a positive integer.

In one embodiment, the T access detections are respectively used for determining whether the T sub-bands are idle.

In one embodiment, the T access detections are respectively used for determining whether the T sub-bands can be used by the first node for transmitting a radio signal.

In one embodiment, end times of the T access detections are respectively no later than start times of transmissions of the T second-type radio signals.

In one embodiment, a given access detection is any access detection of the T access detections, a given sub-band is one of the T sub-bands corresponding to the given access detection, and the given access detection comprises: performing a positive integer number of energy detection(s) respectively in a positive integer number of time sub-pool(s) on the given sub-band, through which a positive integer number of detection value(s) is(are) obtained.

In one embodiment, a given access detection is any access detection of the T access detections, a given sub-band is one of the T sub-bands corresponding to the given access detection, and the given access detection comprises: performing P energy detection(s) respectively in P time sub-pool(s) on the given sub-band, through which P detection value(s) is(are) obtained.

In one embodiment, numbers of time sub-pools respectively comprised by any two of the T access detections may be or may not be the same.

In one embodiment, time-frequency resources respectively occupied by the T second-type radio signals belong to the T time-frequency resource blocks respectively.

In one embodiment, any of the T time-frequency resource blocks comprises at least one sub-frame in time domain.

In one embodiment, any of the T time-frequency resource blocks comprises one sub-frame in time domain.

In one embodiment, any of the T time-frequency resource blocks comprises at least one slot in time domain.

In one embodiment, any of the T time-frequency resource blocks comprises one slot in time domain.

In one embodiment, any of the T time-frequency resource blocks comprises a positive integer number of multicarrier symbol(s) in time domain.

In one embodiment, any of the T time-frequency resource blocks comprises a positive integer number of consecutive multicarrier symbols in time domain.

In one embodiment, any of the T time-frequency resource blocks is a consecutive duration in time domain.

In one embodiment, any of the T time-frequency resource blocks is earlier than the Q time sub-pool(s) in time domain.

In one embodiment, a burst to which any of the T time-frequency resource blocks belongs is earlier than the Q time sub-pool(s) in time domain.

In one embodiment, the T time-frequency resource blocks are mutually orthogonal (that is, non-overlapping) in time domain.

In one embodiment, the T time-frequency resource blocks belong to a first time window in time domain.

In one subembodiment, the first time window comprises a positive integer number of sub-frame(s).

In one subembodiment, the first time window comprises a positive integer number of slot(s).

In one subembodiment, the first time window comprises a positive integer number of consecutive multicarrier symbols.

In one subembodiment, the first time window is a consecutive duration.

In one subembodiment, duration time of the first time window is pre-defined.

In one subembodiment, duration time of the first time window is configurable.

In one subembodiment, duration time of the first time window is configured by a higher-layer signaling.

In one subembodiment, duration time of the first time window is configured by a physical-layer signaling.

In one embodiment, the T sub-bands respectively correspond to the T time-frequency resource blocks.

In one subembodiment, a given sub-band is any sub-band of the T sub-bands, a given time-frequency resource block is one of the T time-frequency resource blocks corresponding to the given sub-band, and frequency-domain resources comprised by the given sub-band are the same as those comprised by the given time-frequency resource block.

In one embodiment, frequency-domain resources comprised by the reference sub-band are the same as frequency-domain resources comprised by the reference time-frequency resource block.

In one embodiment, the reference sub-band comprises the first sub-band.

In one subembodiment, frequency-domain resources comprised by the reference sub-band are the same as frequency-domain resources comprised by the first sub-band.

In one subembodiment, frequency-domain resources comprised by the first sub-band belong to the reference sub-band, and the reference sub-band comprises frequency-domain resources not belonging to the first sub-band.

In one embodiment, the first sub-band is deployed on Unlicensed Spectrum.

In one embodiment, the first sub-band is a BWP.

In one embodiment, at least one of the T sub-bands comprises at least a same frequency point as the first sub-band.

In one subembodiment, at least one of the T sub-bands comprises at least a same subcarrier as the first sub-band.

In one subembodiment, at least one of the T sub-bands is non-orthogonal (that is, partially or entirely overlapping) with the first sub-band.

In one embodiment, at least one of the T sub-bands comprises at least a same frequency-domain resource as the first sub-band.

In one embodiment, the T sub-bands and the first sub-band belong to a same carrier.

In one embodiment, at least one of the T sub-bands is non-orthogonal (that is, partially overlapping) with the first sub-band.

In one embodiment, at least one of the T sub-bands is non-orthogonal (that is, partially or entirely overlapping) with the first sub-band.

In one embodiment, at least one of the T sub-bands comprises the first sub-band.

In one embodiment, a bandwidth of the first sub-band is smaller than that of a carrier to which the first sub-band belongs.

In one embodiment, a bandwidth of the first sub-band is as large as that of a carrier to which the first sub-band belongs.

In one embodiment, a bandwidth of the first sub-band is an integral multiple of 20 MHz.

In one embodiment, a bandwidth of the first sub-band is 20 MHz.

In one embodiment, a bandwidth of the first sub-band is 1 GHz.

In one embodiment, a bandwidth of the first sub-band is x3 MHz, x3 being a positive integer.

In one embodiment, a bandwidth of the first sub-band is x4 GHz, x4 being a positive integer.

In one embodiment, the Q energy detection(s) is(are) used for determining whether the first sub-band is idle.

In one embodiment, the Q energy detection(s) is(are) used for determining whether the first sub-band can be used by the first node for transmitting a radio signal.

In one embodiment, the reference sub-band being one of the T sub-bands that corresponds to the reference first-type radio signal means that a reference access detection is an access detection performed on the reference sub-band out of the T access detections, a reference second-type radio signal is one of the T second-type radio signals associated with the reference first-type radio signal, and the reference access detection is used for determining a transmission of the reference second-type radio signal.

In one embodiment, the T sub-bands respectively correspond to the T first-type radio signals.

In one subembodiment of the above embodiment, a given sub-band is one of the T sub-bands, and a given first-type radio signal is one of the T first-type radio signals that corresponds to the given sub-band, the phrase that the given sub-band corresponds to the given first-type radio signal means that a given access detection is an access detection performed on the given sub-band out of the T access detections, a given second-type radio signal is one of the T second-type radio signals associated with the given first-type radio signal, and the given access detection is used for determining a transmission of the given second-type radio signal.

In one embodiment, the reference time-frequency resource block being one of the T time-frequency resource blocks that corresponds to the reference first-type radio signal means that a reference second-type radio signal is one of the T second-type radio signals associated with the reference first-type radio signal, and the reference time-frequency resource block is a time-frequency resource block used for transmitting the reference second-type radio signal out of the T time-frequency resource blocks.

In one embodiment, the T time-frequency resource blocks respectively correspond to the T first-type radio signals.

In one subembodiment of the above embodiment, a given time-frequency resource block is one of the T time-frequency resource blocks, and a given first-type radio signal is one of the T first-type radio signals that corresponds to the given time-frequency resource block, the phrase that the given time-frequency resource block corresponds to the given first-type radio signal means that a given second-type radio signal is one of the T second-type radio signals associated with the given first-type radio signal, and the given time-frequency resource block is a time-frequency resource block used for transmitting the given second-type radio signal out of the T time-frequency resource blocks.

In one embodiment, the above method also comprises:

receiving S fourth-type radio signal(s), and transmitting S fifth-type radio signal(s) in a reference time-frequency resource block;

herein, the S fourth-type radio signal(s) is(are) respectively associated with the S fifth-type radio signal(s), S being a positive integer; the Q is related to the S fourth-type radio signal(s) and only the reference first-type radio signal of the T first-type radio signals.

In one embodiment, a reference access detection is an access detection performed on the reference sub-band out of the T access detections, and a reference second-type radio signal is one of the T second-type radio signals associated with the reference first-type radio signal, the reference access detection being used for determining a transmission of the reference second-type radio signal as well as transmission(s) of the S fifth-type radio signal(s).

In one subembodiment of the above embodiment, an end time of the reference access detection is no later than a start time of a transmission of the reference second-type radio signal or start time(s) of respective transmission(s) of the S fifth-type radio signal(s).

In one embodiment, time-frequency resources respectively occupied by the S fifth-type radio signals belong to the reference time-frequency resource block.

In one embodiment, any of the S fourth-type radio signal(s) comprises control information.

In one embodiment, each of the S fourth-type radio signal(s) is transmitted in the reference sub-band.

In one embodiment, at least one of the S fourth-type radio signal(s) is transmitted in the reference sub-band.

In one embodiment, at least one of the S fourth-type radio signal(s) is transmitted in a frequency band other than the reference sub-band.

In one embodiment, each of the S fourth-type radio signal(s) is transmitted in a frequency band other than the reference sub-band.

In one embodiment, each of the S fourth-type radio signal(s) is transmitted in a carrier to which the reference sub-band belongs.

In one embodiment, the S fourth-type radio signal(s) is(are) transmitted in a carrier different from a carrier to which the reference sub-band belongs.

In one embodiment, each of the S fourth-type radio signal(s) is transmitted in a frequency band deployed on Licensed Spectrum.

In one embodiment, each of the S fourth-type radio signal(s) is transmitted in a frequency band deployed on Unlicensed Spectrum.

In one embodiment, any of the S fifth-type radio signal(s) comprises data.

In one embodiment, any of the S fifth-type radio signal(s) comprises a reference signal.

In one embodiment, any of the S fifth-type radio signal(s) comprises either data or a reference signal.

In one embodiment, each of the S fifth-type radio signal(s) is composed of data and a reference signal.

In one embodiment, each of the S fifth-type radio signal(s) is transmitted in the reference sub-band.

In one embodiment, each of the S fifth-type radio signal(s) is transmitted in a frequency band deployed on Unlicensed Spectrum.

Embodiment 2

Figure 2:
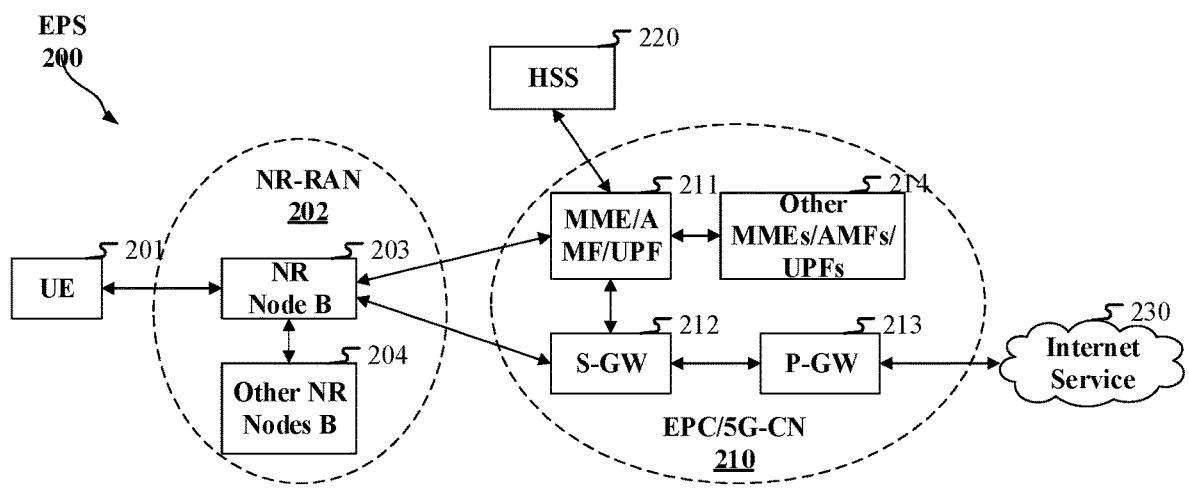
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure, the first node being a UE.

In one embodiment, the gNB 203 corresponds to the first node in the present disclosure, the first node being a base station.

In one embodiment, the UE 201 supports wireless communications where data is transmitted on Unlicensed Spectrum.

In one embodiment, the gNB 203 supports wireless communications where data is transmitted on Unlicensed Spectrum.

Embodiment 3

Figure 3:
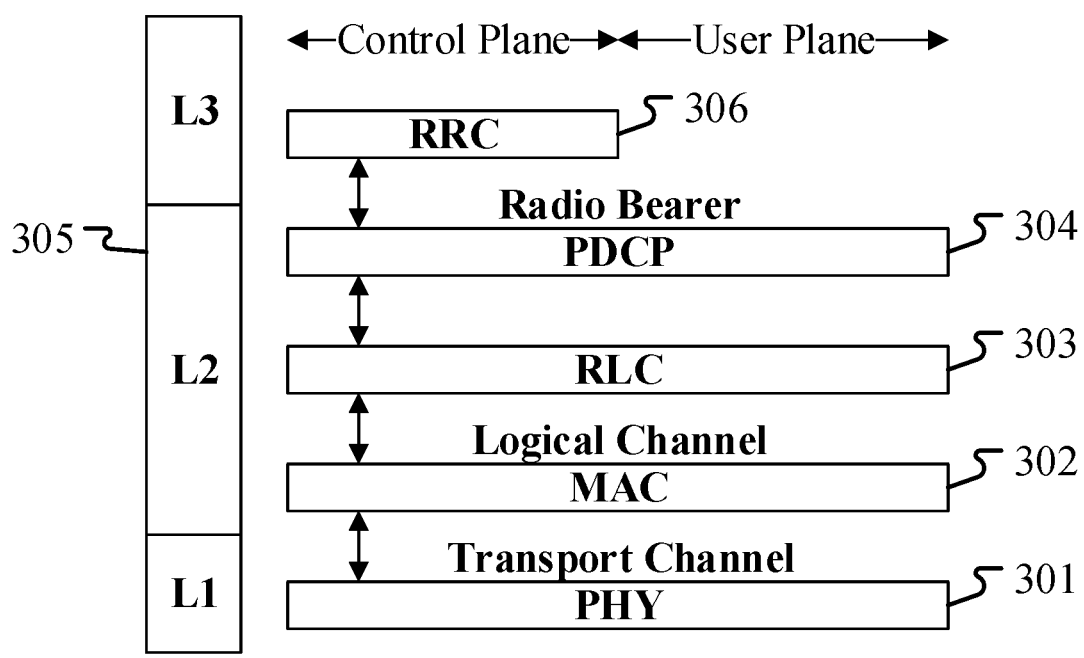
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB, eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the PHY301.

In one embodiment, the T access detections in the present disclosure are generated by the PHY301.

In one embodiment, the T first-type radio signals in the present disclosure are generated by the PHY301.

In one embodiment, the T second-type radio signals in the present disclosure are generated by the PHY301.

In one embodiment, the third-type radio signal in the present disclosure is generated by the PHY301.

In one embodiment, the S fourth-type radio signal(s) in the present disclosure is(are) generated by the PHY301.

In one embodiment, the S fifth-type radio signal(s) in the present disclosure is(are) generated by the PHY301.

In one embodiment, the Q energy detection(s) in the present disclosure is(are) generated by the PHY301.

Embodiment 4

Figure 4:
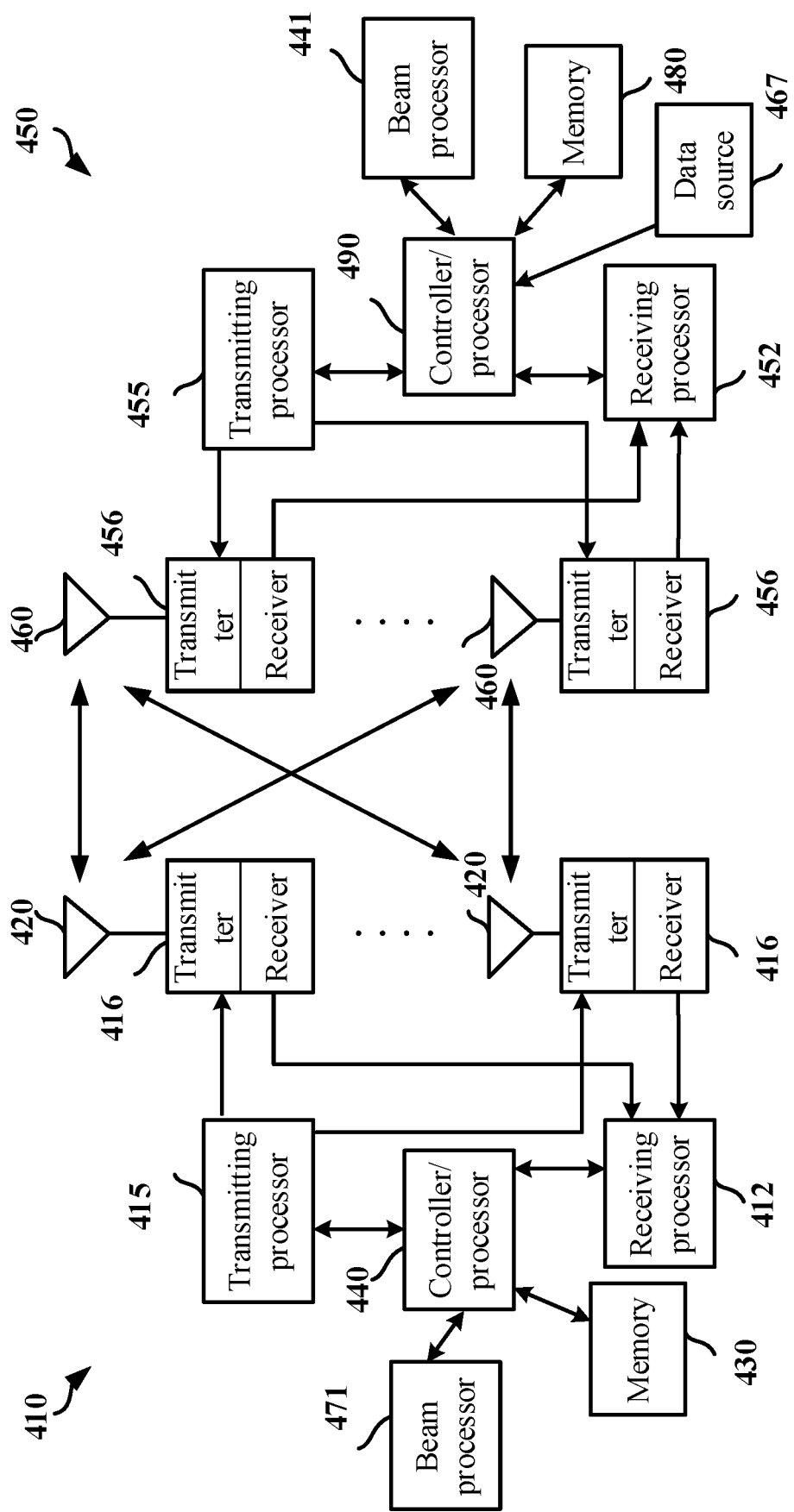
FIG. 4 illustrates a schematic diagram of a New Radio (NR) node and a UE according to one embodiment of the present disclosure.

Embodiment 4 illustrates a schematic diagram of a base station (NR node) and a UE, as shown in FIG. 4. FIG. 4 is a block diagram of a gNB 410 in communication with UE 450 in an access network.

A base station (410) comprises a controller/processor 440, a memory 430, a receiving processor 412, a beam processor 471, a transmitting processor 415, a transmitter/receiver 416 and an antenna 420.

A UE (450) comprises a controller/processor 490, a memory 480, a data source 467, a beam processor 441, a transmitting processor 455, a receiving processor 452, a transmitter/receiver 456 and antenna 460.

In downlink transmission, processes relevant to the base station 410 comprise the following:

A higher-layer packet is provided to the controller/processor 440, and the controller/processor 440 provides header compression, encryption, packet segmentation and reordering as well as multiplexing and demultiplexing between a logical channel and a transport channel so as to implement the L2 layer protocols used for the user plane and the control plane; the higher-layer packet may comprise data or control information, such as a Downlink Shared Channel (DL-SCH).

The controller/processor 440 is associated with the memory 430 that stores program code and data; the memory 430 can be a computer readable medium.

The controller/processor 440 comprises a scheduling unit for transmission requests, where the scheduling unit is used to schedule radio resources corresponding to transmission requests.

The beam processor 471 performs T access detections respectively on T sub-bands, transmits T second-type radio signals respectively in T time-frequency resource blocks and performs Q energy detection(s) respectively in Q time sub-pool(s) on a first sub-band.

The transmitting processor 415 receives bit flows output from the controller/processor 440 and provides various signal transmitting processing functions used for the L1 layer (that is PHY), including coding, interleaving, scrambling, modulating, power control/allocation and generation of physical layer control signaling (such as PBCH, PDCCH, PHICH, PCFICH and a reference signal).

The transmitting processor 415 receives bit flows output from the controller/processor 440 and provides various signal transmitting processing functions used for the L1 layer (that is PHY), including multi-antenna transmission, spreading, code division multiplexing, and precoding.

The transmitter 416 is configured to convert a baseband signal provided from the transmitting processor 415 into a radio frequency signal which is to be transmitted via the antenna 420; each transmitter 416 performs sampling processing on respectively input symbol stream to acquire respective sampled signal stream. And each transmitter 416 further processes respectively sampled stream, for instance, by digital-to-analogue conversion, amplification, filtering and upconversion, to obtain a downlink signal.

In downlink transmission, processes relevant to the UE 450 may comprise the following:

The receiver 456 is used to convert a radio frequency signal received via the antenna 460 into a baseband signal to be provided to the receiving processor 452.

The receiving processor 452 provides various signal receiving processing functions used for the L1 layer (that is PHY), including decoding, de-interleaving, descrambling, demodulating and extraction of physical layer control signaling.

The receiving processor 452 provides various signal receiving processing functions used for the L1 layer (that is PHY), including multi-antenna reception, despreading, code division multiplexing and precoding.

The beam processor 441 determines T first-type radio signals.

The controller/processor 490 receives bit flows output by the receiving processor 452, and provides header decompression, decryption, packet segmentation and reordering as well as multiplexing and demultiplexing between a logical channel and a transport channel so as to implement the L2 layer protocols used for the user plane and the control plane.

The controller/processor 490 is associated with the memory 480 that stores program code and data; the memory 480 may be called a computer readable medium.

In uplink (UL) transmission, processes relevant to the base station 410 comprise the following:

The receiver 416 receives a radio frequency signal via a corresponding antenna 420, converting the radio frequency signal into a baseband signal and providing the baseband signal to the receiving processor 412.

The receiving processor 412 provides various signal receiving processing functions used for the L1 layer (that is PHY), including decoding, de-interleaving, descrambling, demodulation and extraction of physical layer control signaling.

The receiving processor 412 provides various signal receiving processing functions used for the L1 layer (that is PHY), including multi-antenna reception, despreading, code division multiplexing and precoding.

The controller/processor 440 implements the functions of the L2 layer, and is associated with the memory 430 that stores program code and data.

The controller/processor 440 provides demultiplexing between a transport channel and a logical channel, packet reassembling, decryption, header decompression and control signal processing so as to recover a higher-layer packet from the UE450; the higher-layer packet may be provided to a core network.

The beam processor 471 determines T first-type radio signals.

In UL, processes relevant to the UE 450 comprise the following:

The data source 467 provides a higher-layer packet to the controller/processor 490. The data source 467 represents all protocol layers above the L2 layer.

The transmitter 456 transmits a radio frequency signal via a corresponding antenna 460, converting a baseband signal into a radio frequency signal and providing the radio frequency signal to the corresponding antenna 460.

The transmitting processor 455 provides various signal transmitting processing functions used for the L1 layer (i.e., PHY), including coding, interleaving, scrambling, modulation and generation of physical layer control signaling.

The transmitting processor 455 provides various signal transmitting processing functions used for the L1 layer (i.e., PHY), including multi-antenna transmission, spreading, code division multiplexing and precoding.

The controller/processor 490 performs header compression, encryption, packet segmentation and reordering as well as multiplexing between a logical channel and a transport channel based on radio resources allocation of the gNB410, thereby implementing the L2 layer functions used for the user plane and the control plane.

The controller/processor 490 is also in charge of HARQ operation, retransmission of a lost packet and a signaling to the gNB410.

The beam processor 441 performs T access detections respectively on T sub-bands, transmits T second-type radio signals respectively in T time-frequency resource blocks and performs Q energy detection(s) respectively in Q time sub-pool(s) on a first sub-band.

In one embodiment, the UE 450 comprises at least one processor and at least one memory. The at least one memory includes computer program codes. The at least one memory and the computer program codes are configured to be used in collaboration with the at least one processor. The UE 450 at least receives first information; and transmits a first radio signal in a first time window in a first frequency sub-band; herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), of the N time units any two time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, the UE 450 comprises a memory that stores a computer readable instruction program. The computer readable instruction program generates actions when executed by at least one processor, which include: receiving first information; and transmitting a first radio signal in a first time window in a first frequency sub-band; herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), of the N time units any two time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, the gNB 410 comprises at least one processor and at least one memory. The at least one memory includes computer program codes. The at least one memory and the computer program codes are configured to be used in collaboration with the at least one processor. The gNB 410 at least transmits first information; and receives a first radio signal in a first time window in a first frequency sub-band; herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), of the N time units any two time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, the gNB 410 comprises a memory that stores a computer readable instruction program. The computer readable instruction program generates actions when executed by at least one processor, which include: transmitting first information; and receiving a first radio signal in a first time window in a first frequency sub-band; herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), of the N time units any two time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, the UE 450 corresponds to the first node of the present disclosure, the first node being a UE.

In one embodiment, the gNB 410 corresponds to the first node of the present disclosure, the first node being a base station.

In one embodiment, at least the first two of the receiver 456, the receiving processor 452 and the controller/processor 490 are used for receiving the first information in the present disclosure; the first node in the present disclosure is a UE.

In one embodiment, at least the first two of the transmitter 416, the transmitting processor 415 and the controller/processor 440 are used for transmitting the first information in the present disclosure; the first node in the present disclosure is a UE.

In one embodiment, at least the first three of the transmitter/receiver 456, the transmitting processor 455, the receiving processor 452 and the controller/processor 490 are used for receiving the first information in the present disclosure; the first node in the present disclosure is a UE.

In one embodiment, at least the first three of the transmitter/receiver 416, the receiving processor 412, the transmitting processor 415 and the controller/processor 440 are used for transmitting the first information in the present disclosure; the first node in the present disclosure is a UE.

In one embodiment, at least the first two of the receiver 456, the receiving processor 452 and the controller/processor 490 are used for receiving the T first-type radio signals in the present disclosure; the first node in the present disclosure is a UE.

In one embodiment, at least the first two of the transmitter 416, the transmitting processor 415 and the controller/processor 440 are used for transmitting the T first-type radio signals in the present disclosure; the first node in the present disclosure is a UE.

In one embodiment, at least the first three of the transmitter/receiver 456, the transmitting processor 455, the receiving processor 452 and the controller/processor 490 are used for receiving the T first-type radio signals in the present disclosure; the first node in the present disclosure is a UE.

In one embodiment, at least the first three of the transmitter/receiver 416, the receiving processor 412, the transmitting processor 415 and the controller/processor 440 are used for transmitting the T first-type radio signals in the present disclosure; the first node in the present disclosure is a UE.

In one embodiment, at least the first two of the receiver 456, the receiving processor 452 and the controller/processor 490 are used for receiving the S fourth-type radio signal(s) in the present disclosure; the first node in the present disclosure is a UE.

In one embodiment, at least the first two of the transmitter 416, the transmitting processor 415 and the controller/processor 440 are used for transmitting the S fourth-type radio signal(s) in the present disclosure; the first node in the present disclosure is a UE.

In one embodiment, at least the first three of the transmitter/receiver 456, the transmitting processor 455, the receiving processor 452 and the controller/processor 490 are used for receiving the S fourth-type radio signal(s) in the present disclosure; the first node in the present disclosure is a UE.

In one embodiment, at least the first three of the transmitter/receiver 416, the receiving processor 412, the transmitting processor 415 and the controller/processor 440 are used for transmitting the S fourth-type radio signal(s) in the present disclosure; the first node in the present disclosure is a UE.

In one embodiment, at least the first two of the receiver 456, the receiving processor 452 and the controller/processor 490 are used for performing T access detections in the present disclosure respectively on the T sub-bands in the present disclosure; the first node in the present disclosure is a UE.

In one embodiment, at least the first three of the transmitter/receiver 456, the transmitting processor 455, the receiving processor 452 and the controller/processor 490 are used for performing T access detections in the present disclosure respectively on the T sub-bands in the present disclosure; the first node in the present disclosure is a UE.

In one embodiment, at least the first two of the receiver 456, the receiving processor 452 and the controller/processor 490 are used for performing Q energy detection(s) in the present disclosure respectively in the Q time sub-pool(s) on the first sub-band in the present disclosure; the first node in the present disclosure is a UE.

In one embodiment, at least the first two of the transmitter 456, the transmitting processor 455 and the controller/processor 490 are used for transmitting the T second-type radio signals in the present disclosure respectively in the T time-frequency resource blocks in the present disclosure; the first node in the present disclosure is a UE.

In one embodiment, at least the first two of the receiver 416, the receiving processor 412 and the controller/processor 440 are used for receiving the T second-type radio signals in the present disclosure respectively in the T time-frequency resource blocks in the present disclosure; the first node in the present disclosure is a UE.

In one embodiment, at least the first three of the transmitter/receiver 456, the receiving processor 452, the transmitting processor 455 and the controller/processor 490 are used for transmitting the T second-type radio signals in the present disclosure respectively in the T time-frequency resource blocks in the present disclosure; the first node in the present disclosure is a UE.

In one embodiment, at least the first three of the transmitter/receiver 416, the transmitting processor 415, the receiving processor 412 and the controller/processor 440 are used for receiving the T second-type radio signals in the present disclosure respectively in the T time-frequency resource blocks in the present disclosure; the first node in the present disclosure is a UE.

In one embodiment, at least the first two of the transmitter 456, the transmitting processor 455 and the controller/processor 490 are used for transmitting the S fifth-type radio signal(s) in the present disclosure in the reference time-frequency resource block in the present disclosure; the first node in the present disclosure is a UE.

In one embodiment, at least the first two of the receiver 416, the receiving processor 412 and the controller/processor 440 are used for receiving the S fifth-type radio signal(s) in the present disclosure in the reference time-frequency resource block in the present disclosure; the first node in the present disclosure is a UE.

In one embodiment, at least the first three of the transmitter/receiver 456, the receiving processor 452, the transmitting processor 455 and the controller/processor 490 are used for transmitting the S fifth-type radio signal(s) in the present disclosure in the reference time-frequency resource block in the present disclosure; the first node in the present disclosure is a UE.

In one embodiment, at least the first three of the transmitter/receiver 416, the transmitting processor 415, the receiving processor 412 and the controller/processor 440 are used for receiving the S fifth-type radio signal(s) in the present disclosure in the reference time-frequency resource block in the present disclosure; the first node in the present disclosure is a UE.

In one embodiment, at least the first two of the transmitter 456, the transmitting processor 455 and the controller/processor 490 are used for transmitting the third-type radio signal in the present disclosure in the first sub-band in the present disclosure; the first node in the present disclosure is a UE.

In one embodiment, at least the first two of the receiver 416, the receiving processor 412 and the controller/processor 440 are used for receiving the third-type radio signal in the present disclosure in the first sub-band in the present disclosure; the first node in the present disclosure is a UE.

In one embodiment, at least the first three of the transmitter/receiver 456, the receiving processor 452, the transmitting processor 455 and the controller/processor 490 are used for transmitting the third-type radio signal in the present disclosure in the first sub-band in the present disclosure; the first node in the present disclosure is a UE.

In one embodiment, at least the first three of the transmitter/receiver 416, the transmitting processor 415, the receiving processor 412 and the controller/processor 440 are used for receiving the third-type radio signal in the present disclosure in the first sub-band in the present disclosure; the first node in the present disclosure is a UE.

In one embodiment, at least the first two of the receiver 456, the receiving processor 452 and the controller/processor 490 are used for receiving the first information in the present disclosure; the first node in the present disclosure is a base station.

In one embodiment, at least the first two of the transmitter 416, the transmitting processor 415 and the controller/processor 440 are used for transmitting the first information in the present disclosure; the first node in the present disclosure is a base station.

In one embodiment, at least the first three of the transmitter/receiver 456, the transmitting processor 455, the receiving processor 452 and the controller/processor 490 are used for receiving the first information in the present disclosure; the first node in the present disclosure is a base station.

In one embodiment, at least the first three of the transmitter/receiver 416, the receiving processor 412, the transmitting processor 415 and the controller/processor 440 are used for transmitting the first information in the present disclosure; the first node in the present disclosure is a base station.

In one embodiment, at least the first two of the transmitter 456, the transmitting processor 455 and the controller/processor 490 are used for transmitting the T first-type radio signals in the present disclosure; the first node in the present disclosure is a base station.

In one embodiment, at least the first two of the receiver 416, the receiving processor 412 and the controller/processor 440 are used for receiving the T first-type radio signals in the present disclosure; the first node in the present disclosure is a base station.

In one embodiment, at least the first three of the transmitter/receiver 456, the transmitting processor 455, the receiving processor 452 and the controller/processor 490 are used for transmitting the T first-type radio signals in the present disclosure; the first node in the present disclosure is a base station.

In one embodiment, at least the first three of the transmitter/receiver 416, the receiving processor 412, the transmitting processor 415 and the controller/processor 440 are used for receiving the T first-type radio signals in the present disclosure; the first node in the present disclosure is a base station.

In one embodiment, at least the first two of the transmitter 456, the transmitting processor 455 and the controller/processor 490 are used for transmitting the S fourth-type radio signal(s) in the present disclosure; the first node in the present disclosure is a base station.

In one embodiment, at least the first two of the receiver 416, the receiving processor 412 and the controller/processor 440 are used for receiving the S fourth-type radio signal(s) in the present disclosure; the first node in the present disclosure is a base station.

In one embodiment, at least the first three of the transmitter/receiver 456, the transmitting processor 455, the receiving processor 452 and the controller/processor 490 are used for transmitting the S fourth-type radio signal(s) in the present disclosure; the first node in the present disclosure is a base station.

In one embodiment, at least the first three of the transmitter/receiver 416, the receiving processor 412, the transmitting processor 415 and the controller/processor 440 are used for receiving the S fourth-type radio signal(s) in the present disclosure; the first node in the present disclosure is a base station.

In one embodiment, at least the first two of the receiver 416, the receiving processor 412 and the controller/processor 440 are used for performing T access detections in the present disclosure respectively on the T sub-bands in the present disclosure; the first node in the present disclosure is a base station.

In one embodiment, at least the first three of the transmitter/receiver 416, the receiving processor 412, the transmitting processor 415 and the controller/processor 440 are used for performing T access detections in the present disclosure respectively on the T sub-bands in the present disclosure; the first node in the present disclosure is a base station.

In one embodiment, at least the first two of the receiver 416, the receiving processor 412 and the controller/processor 440 are used for performing Q energy detection(s) in the present disclosure respectively in the Q time sub-pool(s) on the first sub-band in the present disclosure; the first node in the present disclosure is a base station.

In one embodiment, at least the first two of the receiver 456, the receiving processor 452 and the controller/processor 490 are used for receiving the T second-type radio signals in the present disclosure respectively in the T time-frequency resource blocks in the present disclosure; the first node in the present disclosure is a base station.

In one embodiment, at least the first two of the transmitter 416, the transmitting processor 415 and the controller/processor 440 are used for transmitting the T second-type radio signals in the present disclosure respectively in the T time-frequency resource blocks in the present disclosure; the first node in the present disclosure is a base station.

In one embodiment, at least the first three of the transmitter/receiver 456, the transmitting processor 455, the receiving processor 452 and the controller/processor 490 are used for receiving the T second-type radio signals in the present disclosure respectively in the T time-frequency resource blocks in the present disclosure; the first node in the present disclosure is a base station.

In one embodiment, at least the first three of the transmitter/receiver 416, the receiving processor 412, the transmitting processor 415 and the controller/processor 440 are used for transmitting the T second-type radio signals in the present disclosure respectively in the T time-frequency resource blocks in the present disclosure; the first node in the present disclosure is a base station.

In one embodiment, at least the first two of the receiver 456, the receiving processor 452 and the controller/processor 490 are used for receiving the S fifth-type radio signal(s) in the present disclosure in the reference time-frequency resource block in the present disclosure; the first node in the present disclosure is a base station.

In one embodiment, at least the first two of the transmitter 416, the transmitting processor 415 and the controller/processor 440 are used for transmitting the S fifth-type radio signal(s) in the present disclosure in the reference time-frequency resource block in the present disclosure; the first node in the present disclosure is a base station.

In one embodiment, at least the first three of the transmitter/receiver 456, the transmitting processor 455, the receiving processor 452 and the controller/processor 490 are used for receiving the S fifth-type radio signal(s) in the present disclosure in the reference time-frequency resource block in the present disclosure; the first node in the present disclosure is a base station.

In one embodiment, at least the first three of the transmitter/receiver 416, the receiving processor 412, the transmitting processor 415 and the controller/processor 440 are used for transmitting the S fifth-type radio signal(s) in the present disclosure in the reference time-frequency resource block in the present disclosure; the first node in the present disclosure is a base station.

In one embodiment, at least the first two of the receiver 456, the receiving processor 452 and the controller/processor 490 are used for receiving the third-type radio signal in the present disclosure in the first sub-band in the present disclosure; the first node in the present disclosure is a base station.

In one embodiment, at least the first two of the transmitter 416, the transmitting processor 415 and the controller/processor 440 are used for transmitting the third-type radio signal in the present disclosure in the first sub-band in the present disclosure; the first node in the present disclosure is a base station.

In one embodiment, at least the first three of the transmitter/receiver 456, the transmitting processor 455, the receiving processor 452 and the controller/processor 490 are used for receiving the third-type radio signal in the present disclosure in the first sub-band in the present disclosure; the first node in the present disclosure is a base station.

In one embodiment, at least the first three of the transmitter/receiver 416, the receiving processor 412, the transmitting processor 415 and the controller/processor 440 are used for transmitting the third-type radio signal in the present disclosure in the first sub-band in the present disclosure; the first node in the present disclosure is a base station.

Embodiment 5

Figure 5:
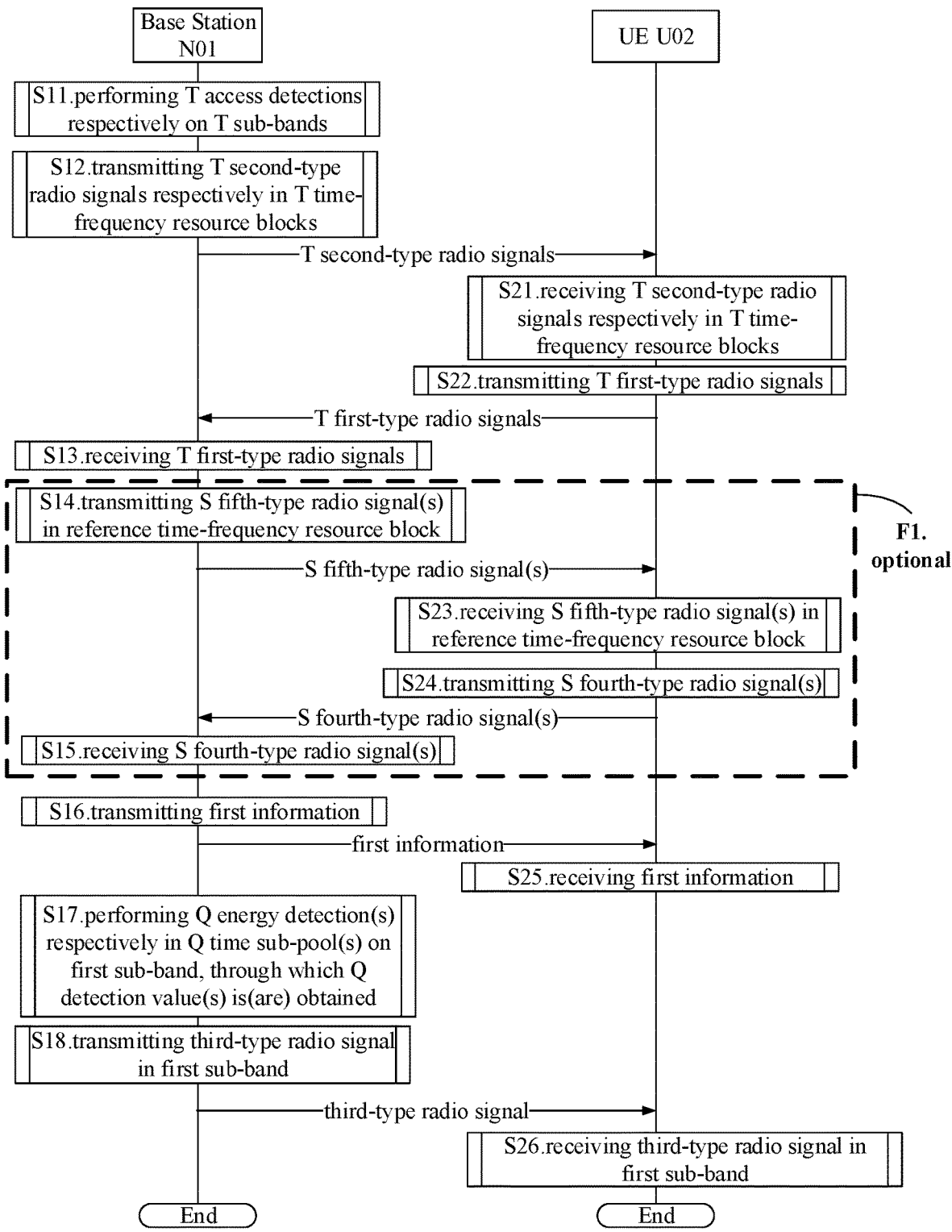
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U02. The box F1 in FIG. 5 is optional.

The N01 performs T access detections respectively on T sub-bands in step S11; transmits T second-type radio signals respectively in T time-frequency resource blocks in step S12; and receives T first-type radio signals in step S13; transmits S fifth-type radio signal(s) in a reference time-frequency resource block in step S14; receives S fourth-type radio signal(s) in step S15; and transmits first information in step S16; performs Q energy detection(s) respectively in Q time sub-pool(s) on a first sub-band in step S17, through which Q detection value(s) is(are) obtained; and transmits a third-type radio signal in a first sub-band in step S18.

The U02 receives T second-type radio signals respectively in T time-frequency resource blocks in step S21; transmits T first-type radio signals in step S22; and also receives S fifth-type radio signal(s) in a reference time-frequency resource block in step S23; transmits S fourth-type radio signal(s) in step S24; receives first information in step S25; and receives a third-type radio signal in a first sub-band in step S26.

In Embodiment 5, the T is a positive integer greater than 1, and the Q is a positive integer; the T sub-bands comprise at least one same frequency point, or the T sub-bands belong to a same carrier; at least one sub-band of the T sub-bands is different from the first sub-band; the T first-type radio signals are respectively associated with the T second-type radio signals; a reference first-type radio signal is one of the T first-type radio signals, the Q is related only to the reference first-type radio signal of the T first-type radio signals; the T access detections are respectively used by the N01 for determining transmissions of the T second-type radio signals; a reference sub-band is one of the T sub-bands corresponding to the reference first-type radio signal, and a reference time-frequency resource block is one of the T time-frequency resource blocks corresponding to the reference first-type radio signal; selection of the reference time-frequency resource block is related to at least one of the first sub-band or the reference sub-band; the first node is a base station, and the T first-type radio signals respectively indicate whether the T second-type radio signals are correctly received; a reference second-type radio signal is one of the T second-type radio signals associated with the reference first-type radio signal, and the reference second-type radio signal comprises W sub-signal(s), W being a positive integer; whether the W sub-signal(s) is(are) correctly received is used by the N01 for determining the Q. A start time of time-domain resources occupied by the third-type radio signal is no earlier than an end time of the Q time sub-pool(s). And the first information comprises scheduling information of the third-type radio signal.

In one embodiment, a ratio of a number of sub-signal(s) not having been correctly received out of the W sub-signal(s) to the W is used for determining the Q.

In one embodiment, the first node is a base station, and the S fourth-type radio signal(s) indicates(indicate) whether the S fifth-type radio signal(s) is(are) correctly received respectively; the reference first-type radio signal and the S fourth-type radio signal(s) are jointly used for determining the Q.

In one subembodiment of the above embodiment, the S fifth-type radio signal(s) comprises(comprise) W1 sub-signal(s), W1 being a positive integer; whether the W sub-signal(s) and the W1 sub-signal(s) are correctly received is used by the N01 for determining the Q.

In one subembodiment of the above embodiment, a ratio of a number of sub-signal(s) not having been correctly received among the total of the W sub-signal(s) and the W1 sub-signal(s) to a sum of the W and the W1 is used by the N01 for determining the Q.

In one embodiment, the Q energy detection(s) is(are) respectively energy detection(s) in a downlink access detection.

In one embodiment, a start time of a transmission of any of the T first-type radio signals is later than an end time of a transmission of an associated second-type radio signal of the T second-type radio signals.

In one embodiment, each of the T first-type radio signals comprises Hybrid Automatic Repeat reQuest ACKnowledgement (HARQ-ACK).

In one embodiment, any of the T first-type radio signals comprises Uplink control information (UCI), and the first node is a base station.

In one embodiment, the T first-type radio signals are respectively transmitted on T uplink physical layer control channels (i.e., uplink channels only capable of carrying physical layer signaling).

In one subembodiment of the above embodiment, the T uplink physical layer control channels are Physical Uplink Control CHannels (PUCCHs) respectively.

In one subembodiment of the above embodiment, the T uplink physical layer control channels are short PUCCHs (sPUCCHs) respectively.

In one subembodiment of the above embodiment, the T uplink physical layer control channels are New Radio PUCCHs (NR-PUCCHs) respectively.

In one subembodiment of the above embodiment, the T uplink physical layer control channels are Narrow Band PUCCHs (NB-PUCCHs) respectively.

In one embodiment, the T first-type radio signals are respectively transmitted on T uplink physical layer data channels (i.e., uplink channels capable of carrying physical layer data).

In one subembodiment of the above embodiment, the T uplink physical layer data channels are Physical Uplink Shared CHannels (PUSCHs) respectively.

In one subembodiment of the above embodiment, the T uplink physical layer data channels are short PUSCHs (sPUSCHs) respectively.

In one subembodiment of the above embodiment, the T uplink physical layer data channels are New Radio PUSCHs (NR-PUSCHs) respectively.

In one subembodiment of the above embodiment, the T uplink physical layer data channels are Narrow Band PUSCHs (NB-PUSCHs) respectively.

In one embodiment, any of the T second-type radio signals comprises data.

In one embodiment, the T second-type radio signals are respectively transmitted on T downlink physical layer data channels (i.e., downlink channels capable of carrying physical layer data).

In one subembodiment of the above embodiment, the T downlink physical layer data channels are Physical Downlink Shared CHannels (PDSCHs) respectively.

In one subembodiment of the above embodiment, the T downlink physical layer data channels are short PDSCHs (sPDSCHs) respectively.

In one subembodiment of the above embodiment, the T downlink physical layer data channels are New Radio PDSCHs (NR-PDSCHs) respectively.

In one subembodiment of the above embodiment, the T downlink physical layer data channels are Narrow Band PDSCHs (NB-PDSCHs) respectively.

In one embodiment, transmission channels for the T second-type radio signals are DownLink Shared Channels (DL-SCHs) respectively.

In one embodiment, a start time of a transmission of any of the S fourth-type radio signal(s) is later than an end time of a transmission of an associated fifth-type radio signal out of the S fifth-type radio signal(s).

In one embodiment, each of the S fourth-type radio signal(s) comprises HARQ-ACK.

In one embodiment, any of the S fourth-type radio signal(s) comprises UCI, and the first node is a base station.

In one embodiment, the S fourth-type radio signal(s) is(are) respectively transmitted on S uplink physical layer control channel(s) (i.e., uplink channel(s) only capable of carrying physical layer signaling).

In one subembodiment of the above embodiment, the S uplink physical layer control channel(s) is(are) PUCCH(s) respectively.

In one subembodiment of the above embodiment, the S uplink physical layer control channel(s) is(are) sPUCCH(s) respectively.

In one subembodiment of the above embodiment, the S uplink physical layer control channel(s) is(are) NR-PUCCH(s) respectively.

In one subembodiment of the above embodiment, the S uplink physical layer control channel(s) is(are) NB-PUCCH(s) respectively.

In one embodiment, the S fourth-type radio signal(s) is(are) respectively transmitted on S uplink physical layer data channel(s) (i.e., uplink channel(s) capable of carrying physical layer data).

In one subembodiment of the above embodiment, the S uplink physical layer data channel(s) is(are) PUSCH(s) respectively.

In one subembodiment of the above embodiment, the S uplink physical layer data channel(s) is(are) sPUSCH(s) respectively.

In one subembodiment of the above embodiment, the S uplink physical layer data channel(s) is(are) NR-PUSCH(s) respectively.

In one subembodiment of the above embodiment, the S uplink physical layer data channel(s) is(are) NB-PUSCH(s) respectively.

In one embodiment, any of the S fifth-type radio signal(s) comprises data.

In one embodiment, the S fifth-type radio signal(s) is(are) respectively transmitted on S downlink physical layer data channel(s) (i.e., downlink channel(s) capable of carrying physical layer data).

In one subembodiment of the above embodiment, the S downlink physical layer data channel(s) is(are) PDSCH(s) respectively.

In one subembodiment of the above embodiment, the S downlink physical layer data channel(s) is(are) sPDSCH(s) respectively.

In one subembodiment of the above embodiment, the S downlink physical layer data channel(s) is(are) NR-PDSCH(s) respectively.

In one subembodiment of the above embodiment, the S downlink physical layer data channel(s) is(are) NB-PDSCH(s) respectively.

In one embodiment, transmission channel(s) for the S fifth-type radio signal(s) is(are) DL-SCH(s) respectively.

In one embodiment, frequency-domain resources occupied by the third-type radio signal belong to the first sub-band.

In one embodiment, the third-type radio signal comprises at least one of data, control information or a reference signal.

In one embodiment, the third-type radio signal comprises data.

In one embodiment, the third-type radio signal comprises control information.

In one embodiment, the third-type radio signal comprises a reference signal.

In one embodiment, the third-type radio signal comprises data, control information and a reference signal.

In one embodiment, the third-type radio signal comprises data and control information.

In one embodiment, the third-type radio signal comprises control information and a reference signal.

In one embodiment, the third-type radio signal comprises data and a reference signal.

In one subembodiment, the data refers to downlink data, the control information is Downlink Control Information (DCI), and the reference signal comprises one or more of DeModulation Reference Signals (DMRS), a Channel State Information-Reference Signal (CSI-RS), fine time/frequency Tracking Reference Signals (TRS) or Phase error Tracking Reference Signals (PRTS).

In one embodiment, scheduling information of the third-type radio signal comprises at least one of a Modulation and Coding Scheme (MCS), configuration information of DMRS, a HARQ process number, a Redundancy Version (RV), a New Data Indicator (NDI), occupied time-frequency resources, corresponding multi-antenna related transmission or corresponding multi-antenna related reception.

In one subembodiment, the third-type radio signal comprises data.

In one subembodiment, the configuration information of the DMRS comprises one or more of occupied time-domain resources, occupied frequency-domain resources, occupied code-domain resources, a cyclic shift or an Orthogonal Cover Code (OCC).

In one embodiment, scheduling information of the third-type radio signal comprises at least one of occupied time-domain resources, occupied frequency-domain resources, occupied code-domain resources, a cyclic shift, an Orthogonal Cover Code (OCC), an occupied antenna port, corresponding multi-antenna related transmission or corresponding multi-antenna related reception.

In one subembodiment, the third-type radio signal comprises a reference signal.

In one embodiment, the third-type radio signal is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, a transmission channel for the third-type radio signal is a DL-SCH.

In one embodiment, the first information is dynamically configured.

In one embodiment, the first information is carried by a physical layer signaling.

In one embodiment, the first information belongs to DCI.

In one embodiment, the first information belongs to DownLink Grant DCI.

In one embodiment, the first information is a field of a piece of DCI, the field comprising a positive integer number of bit(s).

In one embodiment, the first information is composed of multiple fields of a piece of DCI, each comprising a positive integer number of bit(s).

In one embodiment, the first information is semi-statically configured.

In one embodiment, the first information is carried by a higher-layer signaling.

In one embodiment, the first information is carried by a Radio Resource Control (RRC) signaling.

In one embodiment, the first information is all or part of an Information Element (IE) in an RRC signaling.

In one embodiment, the first information is carried by a Medium Access Control (MAC) Control Element (CE) signaling.

In one embodiment, the first information is transmitted in a System Information Block (SIB).

In one embodiment, the first information is transmitted in the first sub-band.

In one embodiment, the first information is transmitted in a frequency band other than the first sub-band.

In one embodiment, the first information is transmitted in a frequency band deployed on Licensed Spectrum other than the first sub-band.

In one embodiment, the first information is transmitted in a frequency band deployed on Unlicensed Spectrum other than the first sub-band.

In one embodiment, the first information is transmitted on a downlink physical layer control channel (i.e., a downlink channel only capable of carrying a physical layer signaling).

In one subembodiment, the downlink physical layer control channel is a Physical Downlink Control CHannel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first information is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, the multi-antenna related reception refers to Spatial Rx parameters.

In one embodiment, the multi-antenna related reception refers to a receiving beam.

In one embodiment, the multi-antenna related reception refers to a reception beamforming matrix.

In one embodiment, the multi-antenna related reception refers to a reception analog beamforming matrix.

In one embodiment, the multi-antenna related reception refers to a reception analog beamforming vector.

In one embodiment, the multi-antenna related reception refers to a reception beamforming vector.

In one embodiment, the multi-antenna related reception refers to Rx spatial filtering.

In one embodiment, the multi-antenna related transmission refers to Spatial Tx parameters.

In one embodiment, the multi-antenna related transmission refers to a transmitting beam.

In one embodiment, the multi-antenna related transmission refers to a transmission beamforming matrix.

In one embodiment, the multi-antenna related transmission refers to a transmission analog beamforming matrix.

In one embodiment, the multi-antenna related transmission refers to a transmission analog beamforming vector.

In one embodiment, the multi-antenna related transmission refers to a transmission beamforming vector.

In one embodiment, the multi-antenna related transmission refers to Tx spatial filtering.

In one embodiment, the Spatial Tx parameters include one or more of a transmission antenna port, a transmission antenna port group, a transmitting beam, a transmission analog beamforming matrix, a transmission analog beamforming vector, a transmission beamforming matrix, a transmission beamforming vector or a Tx spatial filtering.

In one embodiment, the Spatial Rx parameters include one or more of a receiving beam, a reception analog beamforming matrix, a reception analog beamforming vector, a reception beamforming matrix, a reception beamforming vector or a Rx spatial filtering.

Embodiment 6

Figure 6:
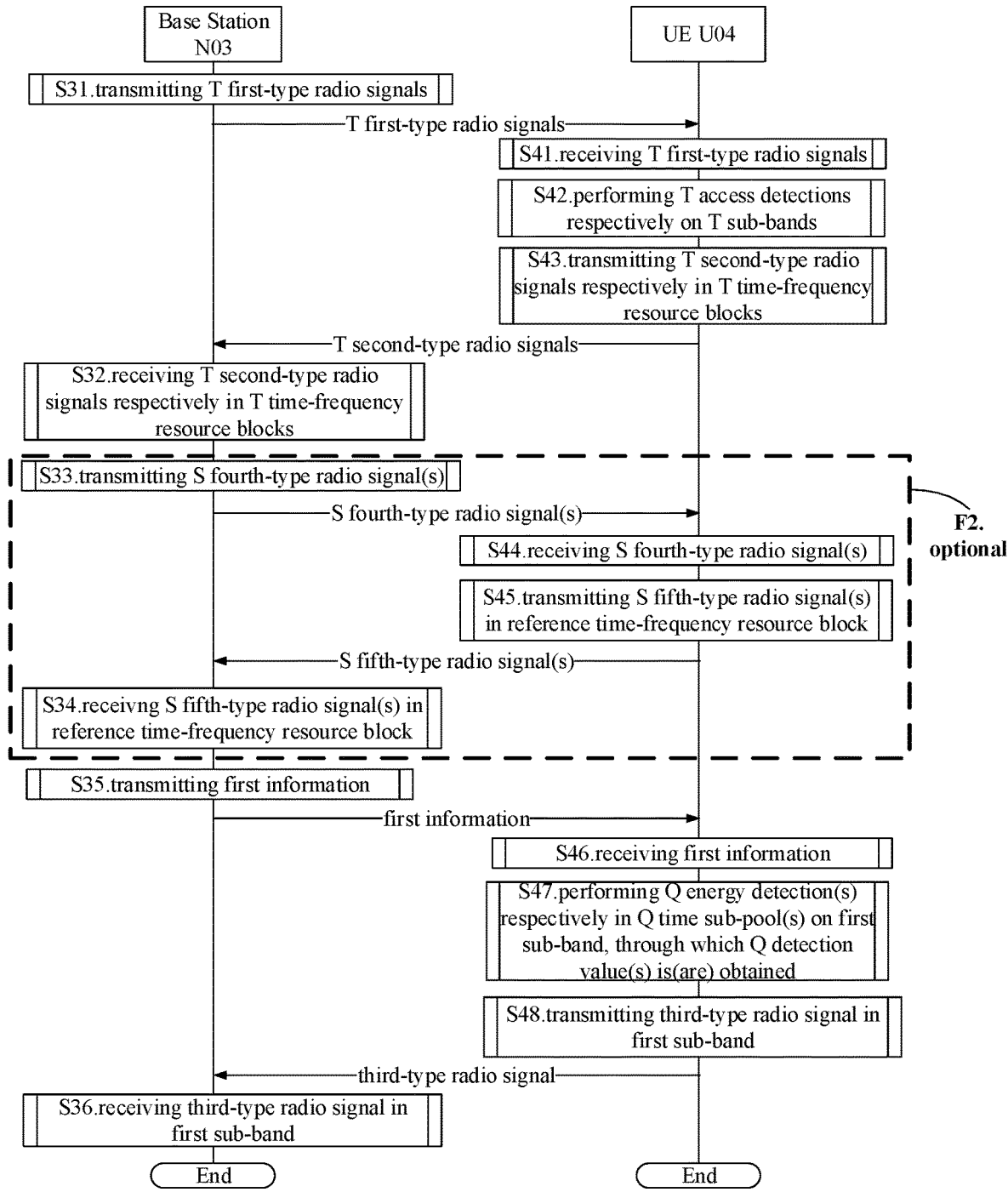
FIG. 6 illustrates a flowchart of wireless transmission according to another embodiment of the present disclosure.

Embodiment 6 illustrates another flowchart of wireless transmission, as shown in FIG. 6. In FIG. 6, a base station N03 is a maintenance base station for a serving cell of a UE U04. The box F2 in FIG. 6 is optional.

The N03 transmits T first-type radio signals in step S31; receives T second-type radio signals respectively in T time-frequency resource blocks in step S32; and transmits S fourth-type radio signal(s) in step S33; receives S fifth-type radio signal(s) in a reference time-frequency resource block in step S34; transmits first information in step S35; and receives a third-type radio signal in a first sub-band in step S36.

The U04 receives T first-type radio signals in step S41; performs T access detections respectively on T sub-bands in step S42; and transmits T second-type radio signals respectively in T time-frequency resource blocks in step S43; receives S fourth-type radio signal(s) in step S44; and also transmits S fifth-type radio signal(s) in a reference time-frequency resource block in step S45; receives first information in step S46; performs Q energy detection(s) respectively in Q time sub-pool(s) on a first sub-band in step S47, through which Q detection value(s) is(are) obtained; and transmits a third-type radio signal in a first sub-band in step S48.

In Embodiment 6, the T is a positive integer greater than 1, and the Q is a positive integer; the T sub-bands comprise at least one same frequency point, or the T sub-bands belong to a same carrier; at least one sub-band of the T sub-bands is different from the first sub-band; the T first-type radio signals are respectively associated with the T second-type radio signals; a reference first-type radio signal is one of the T first-type radio signals, the Q is related only to the reference first-type radio signal of the T first-type radio signals; the T access detections are respectively used by the U04 for determining transmissions of the T second-type radio signals; a reference sub-band is one of the T sub-bands corresponding to the reference first-type radio signal, and a reference time-frequency resource block is one of the T time-frequency resource blocks corresponding to the reference first-type radio signal; selection of the reference time-frequency resource block is related to at least one of the first sub-band or the reference sub-band; the first node is a UE, and the T first-type radio signals respectively comprise scheduling information of the T second-type radio signals; a reference second-type radio signal is one of the T second-type radio signals associated with the reference first-type radio signal, and the reference second-type radio signal comprises V sub-signal(s), V being a positive integer; the reference first-type radio signal is used by the U04 for respectively determining whether the V sub-signal(s) comprises(comprise) new data; whether the V sub-signal(s) comprises(comprise) new data is used by the U04 for determining the Q. A start time of time-domain resources occupied by the third-type radio signal is no earlier than an end time of the Q time sub-pool(s). And the first information comprises scheduling information of the third-type radio signal.

In one embodiment, a number of sub-signal(s) comprising new data out of the V sub-signal(s) is used by the U04 for determining the Q.

In one embodiment, the first node is a UE, and the S fourth-type radio signal(s) respectively comprises(comprise) scheduling information of the S fifth-type radio signal(s); the reference first-type radio signal and the S fourth-type radio signal(s) are jointly used by the U04 for determining the Q.

In one embodiment, the S fifth-type radio signal(s) comprises(comprise) V1 sub-signal(s), and whether the V sub-signal(s) and the V1 sub-signal(s) comprise new data is used by the U04 for determining the Q.

In one subembodiment, a number of sub-signal(s) comprising new data among the V sub-signal(s) and the V1 sub-signal(s) is used by the U04 for determining the Q.

In one embodiment, the Q energy detection(s) is(are) energy detection(s) in an uplink access detection.

In one embodiment, an end time of a transmission of any of the T first-type radio signals is earlier than a start time of a transmission of one of the T second-type radio signals.

In one embodiment, any of the T first-type radio signals comprises DCI, and the first node is a UE.

In one embodiment, the T first-type radio signals are respectively transmitted on T downlink physical layer control channels (i.e., downlink channels only capable of carrying physical layer signaling).

In one subembodiment of the above embodiment, the T downlink physical layer control channels are PDCCHs respectively.

In one subembodiment of the above embodiment, the T downlink physical layer control channels are sPDCCHs respectively.

In one subembodiment of the above embodiment, the T downlink physical layer control channels are NR-PDCCHs respectively.

In one subembodiment of the above embodiment, the T downlink physical layer control channels are NB-PDCCHs respectively.

In one embodiment, the T second-type radio signals are respectively transmitted on T uplink physical layer data channels (i.e., uplink channels capable of carrying physical layer data).

In one subembodiment of the above embodiment, the T uplink physical layer data channels are PUSCHs respectively.

In one subembodiment of the above embodiment, the T uplink physical layer data channels are sPUSCHs respectively.

In one subembodiment of the above embodiment, the T uplink physical layer data channels are NR-PUSCHs respectively.

In one subembodiment of the above embodiment, the T uplink physical layer data channels are NB-PUSCHs respectively.

In one embodiment, transmission channels for the T second-type radio signals are Uplink Shared Channels (UL-SCHs) respectively.

In one embodiment, scheduling information of any second-type radio signal of the T second-type radio signals comprises at least one of a Modulation and Coding Scheme (MCS), configuration information of DMRS, a HARQ process number, a Redundancy Version (RV), a New Data Indicator (NDI), occupied time-frequency resources, corresponding multi-antenna related transmission or corresponding multi-antenna related reception.

In one subembodiment of the above embodiment, the configuration information of the DMRS comprises one or more of occupied time-domain resources, occupied frequency-domain resources, occupied code-domain resources, a cyclic shift or an Orthogonal Cover Code (OCC).

In one embodiment, an end time of a transmission of any of the S fourth-type radio signal(s) is earlier than a start time of a transmission of one of the S fifth-type radio signal(s).

In one embodiment, any of the S fourth-type radio signal(s) comprises DCI, and the first node is a UE.

In one embodiment, the S fourth-type radio signal(s) is(are) respectively transmitted on S downlink physical layer control channel(s) (i.e., downlink channel(s) only capable of carrying physical layer signaling).

In one subembodiment of the above embodiment, the S downlink physical layer control channel(s) is(are) PDCCH(s).

In one subembodiment of the above embodiment, the S downlink physical layer control channel(s) is(are) sPDCCH(s).

In one subembodiment of the above embodiment, the S downlink physical layer control channel(s) is(are) NR-PDCCH(s).

In one subembodiment of the above embodiment, the S downlink physical layer control channel(s) is(are) NB-PDCCH(s).

In one embodiment, the S fifth-type radio signal(s) is(are) respectively transmitted on S uplink physical layer data channel(s) (i.e., uplink channel(s) capable of carrying physical layer data).

In one subembodiment of the above embodiment, the S uplink physical layer data channel(s) is(are) PUSCH(s).

In one subembodiment of the above embodiment, the S uplink physical layer data channel(s) is(are) sPUSCH(s).

In one subembodiment of the above embodiment, the S uplink physical layer data channel(s) is(are) NR-PUSCH(s).

In one subembodiment of the above embodiment, the S uplink physical layer data channel(s) is(are) NB-PUSCH(s).

In one embodiment, transmission channel(s) for the S fifth-type radio signal(s) is(are) respectively Uplink Shared Channel(s) (UL-SCH).

In one embodiment, scheduling information of any of the S fifth-type radio signal(s) comprises at least one of an MCS, configuration information of DMRS, a HARQ process number, an RV, an NDI, occupied time-frequency resources, corresponding multi-antenna related transmission or corresponding multi-antenna related reception.

In one subembodiment, the configuration information of the DMRS comprises one or more of occupied time-domain resources, occupied frequency-domain resources, occupied code-domain resources, a cyclic shift or an Orthogonal Cover Code (OCC).

In one embodiment, the first information belongs to UpLink Grant DCI.

In one embodiment, frequency-domain resources occupied by the third-type radio signal belong to the first sub-band.

In one embodiment, the third-type radio signal comprises at least one of data, control information or a reference signal.

In one embodiment, the third-type radio signal comprises data.

In one embodiment, the third-type radio signal comprises control information.

In one embodiment, the third-type radio signal comprises a reference signal.

In one embodiment, the third-type radio signal comprises data, control information and a reference signal.

In one embodiment, the third-type radio signal comprises data and control information.

In one embodiment, the third-type radio signal comprises control information and a reference signal.

In one embodiment, the third-type radio signal comprises data and a reference signal.

In one subembodiment of the above embodiment, the data refers to uplink data, the control information is UCI, and the reference signal comprises one or more of a DMRS, a Sounding Reference Signal (SRS) or a PTRS.

In one embodiment, the third-type radio signal is transmitted on an uplink physical layer data channel (i.e., an uplink channel capable of carrying physical layer data).

In one subembodiment of the above embodiment, the uplink physical layer data channel is a PUSCH.

In one subembodiment of the above embodiment, the uplink physical layer data channel is an sPUSCH.

In one subembodiment of the above embodiment, the uplink physical layer data channel is an NR-PUSCH.

In one subembodiment of the above embodiment, the uplink physical layer data channel is an NB-PUSCH.

In one embodiment, a transmission channel for the third-type radio signal is a UL-SCH.

Embodiment 7

Figure 7:
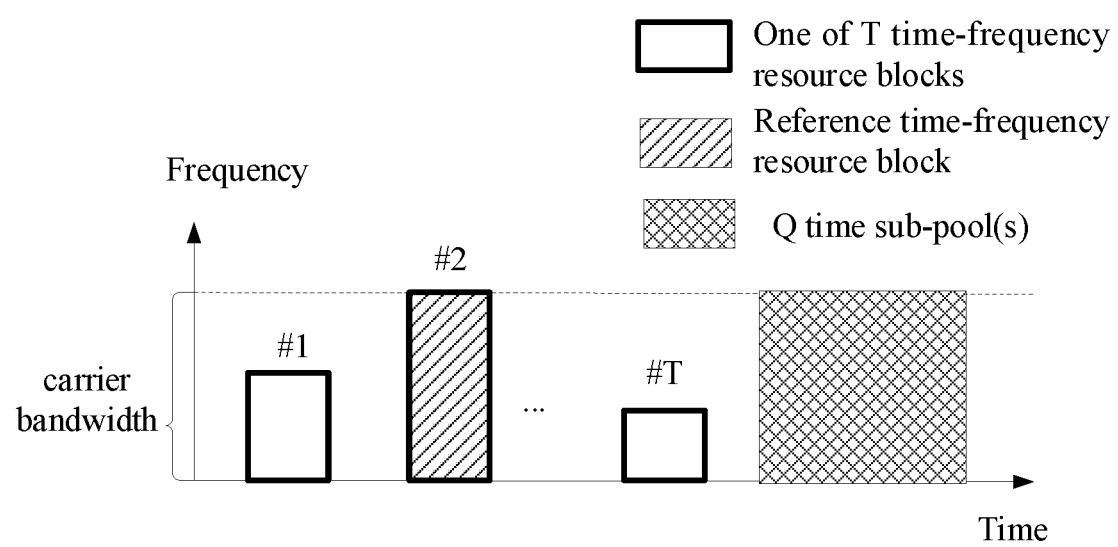
FIG. 7 illustrates a schematic diagram of selection of a reference time-frequency resource block according to one embodiment of the present disclosure.

Embodiment 7 illustrates a schematic diagram of selection of a reference time-frequency resource block, as shown in FIG. 7.

In Embodiment 7, the selection of the reference time-frequency resource block is related to at least one of the first sub-band or the reference sub-band in the present disclosure; a bandwidth of the reference sub-band is equal to a bandwidth of a carrier to which the reference sub-band belongs.

In one embodiment, a bandwidth of the reference sub-band is equal to a bandwidth of a carrier to which the first sub-band belongs.

In one embodiment, frequency-domain resources comprised by the reference sub-band are the same as frequency-domain resources comprised by a carrier to which the reference sub-band belongs.

In one embodiment, the selection of the reference time-frequency resource block is related to the reference sub-band.

In one embodiment, a bandwidth of each sub-band of t1 sub-band(s) out of the T sub-bands in the present disclosure is equal to a bandwidth of a carrier to which the reference sub-band belongs, t1 being a positive integer no greater than the T.

In one subembodiment, the t1 is greater than 1, the reference time-frequency resource block being one of t1 time-frequency resource blocks respectively corresponding to the t1 sub-bands of the T time-frequency resource blocks, which is closest to a start time of the Q time sub-pool(s) in time domain.

In one subembodiment, the t1 is equal to 1, the reference time-frequency resource block being t1 time-frequency resource block of the T time-frequency resource blocks that corresponds to the t1 sub-band.

Embodiment 8

Figure 8:
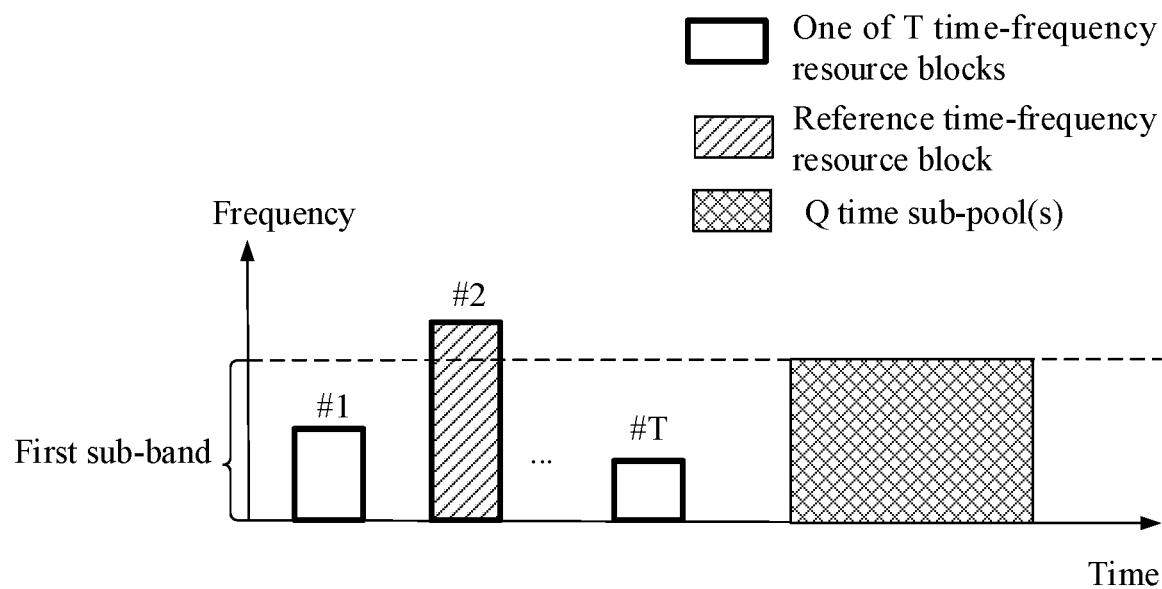
FIG. 8 illustrates a schematic diagram of selection of a reference time-frequency resource block according to one embodiment of the present disclosure.

Embodiment 8 illustrates another schematic diagram of selection of a reference time-frequency resource block, as shown in FIG. 8.

In Embodiment 8, the reference time-frequency resource block is related to at least one of the first sub-band or the reference sub-band in the present disclosure; each of t time-frequency resource block(s) out of the T time-frequency resource blocks in the present disclosure comprises the first sub-band, the t being a positive integer no greater than the T; the reference time-frequency resource is one of the t time-frequency resource block(s).

In one embodiment, the selection of the reference time-frequency resource block is related to both the first sub-band and the reference sub-band.

In one embodiment, the t is equal to 1, the reference time-frequency resource block being the t time-frequency resource block.

In one embodiment, the t is greater than 1, the reference time-frequency resource block being one of the t time-frequency resource blocks that is closest to a start time of the Q time sub-pool(s) in time domain.

In one embodiment, the t is greater than 1, the reference time-frequency resource block being one of the t time-frequency resource blocks whose corresponding start time is closest to that of the Q time sub-pool(s) in time domain.

Embodiment 9

Figure 9:
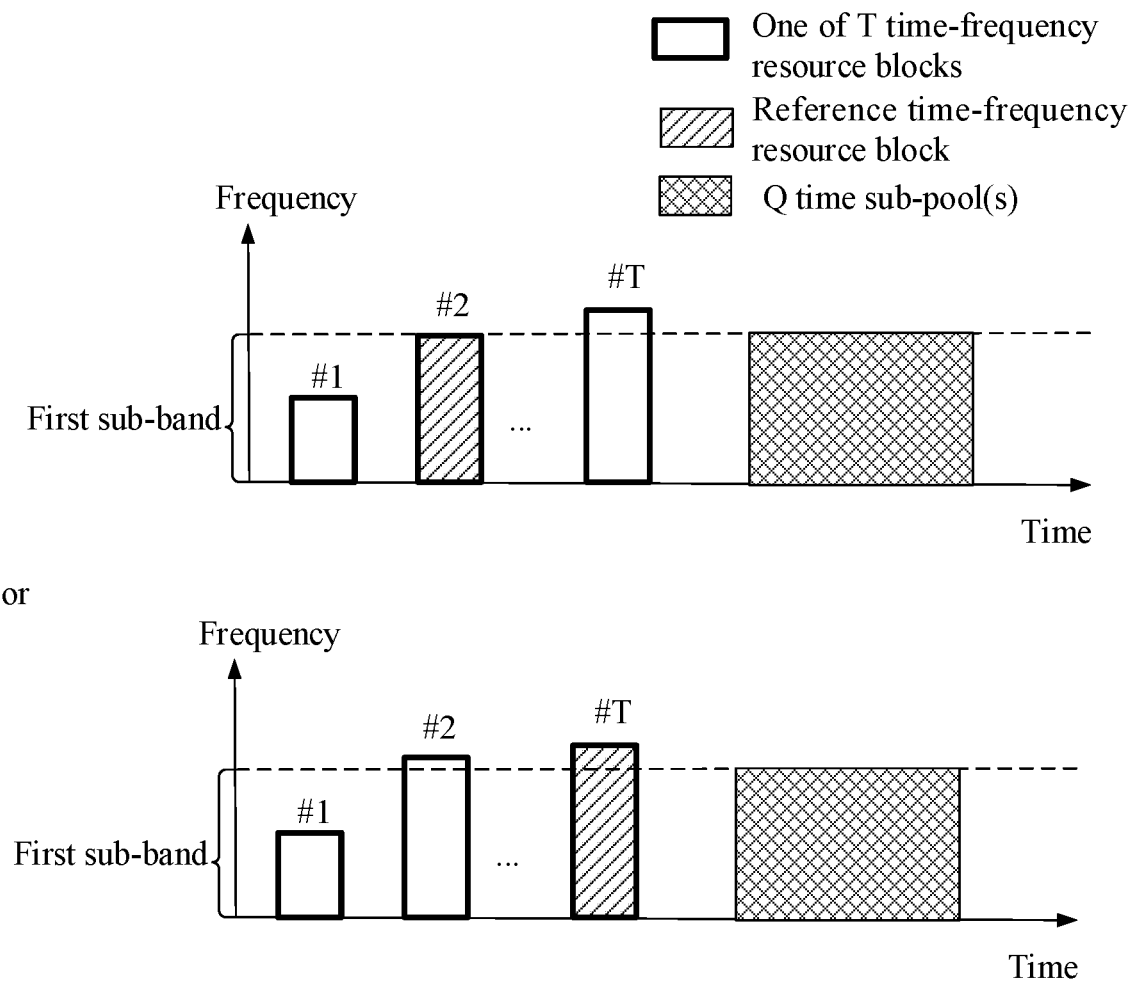
FIG. 9 illustrates a schematic diagram of selection of a reference time-frequency resource block according to one embodiment of the present disclosure.

Embodiment 9 illustrates another schematic diagram of selection of a reference time-frequency resource block, as shown in FIG. 9.

In Embodiment 9, the reference time-frequency resource block is related to at least one of the first sub-band or the reference sub-band in the present disclosure; each of t time-frequency resource block(s) out of the T time-frequency resource blocks in the present disclosure comprises the first sub-band, the t being a positive integer no greater than the T; frequency-domain resources respectively comprised by t1 time-frequency resource block(s) of the t time-frequency resource block(s) are the same as frequency-domain resources comprised by the first sub-band, the t1 being a positive integer no greater than the t; the reference time-frequency resource block is one of the t1 time-frequency resource block(s); or, frequency-domain resources comprised by any of the t time-frequency resource block(s) are not completely the same as frequency-domain resources comprised by the first sub-band, the reference time-frequency resource block being one of the t time-frequency resource block(s).

In one embodiment, frequency-domain resources respectively comprised by t1 time-frequency resource block of the t time-frequency resource block(s) are the same as frequency-domain resources comprised by the first sub-band, the t1 being equal to 1, and the reference time-frequency resource block being the t1 time-frequency resource block.

In one embodiment, frequency-domain resources respectively comprised by t1 time-frequency resource blocks of the t time-frequency resource blocks are the same as frequency-domain resources comprised by the first sub-band, the t1 being greater than 1, and the reference time-frequency resource block being one of the t1 time-frequency resource blocks that is in closest proximity to a start time of the Q time sub-pool(s) in time domain.

In one embodiment, frequency-domain resources respectively comprised by t1 time-frequency resource blocks of the t time-frequency resource blocks are the same as frequency-domain resources comprised by the first sub-band, the t1 being greater than 1, and the reference time-frequency resource block being one of the t1 time-frequency resource blocks whose corresponding start time is closest to that of the Q time sub-pool(s) in time domain.

In one embodiment, frequency-domain resources comprised by any of the t time-frequency resource block are not completely the same as frequency-domain resources comprised by the first sub-band, the t being equal to 1, and the reference time-frequency resource block being the t time-frequency resource block.

In one embodiment, frequency-domain resources comprised by any of the t time-frequency resource blocks are not completely the same as frequency-domain resources comprised by the first sub-band, the t being greater than 1, and the reference time-frequency resource block is one of the t time-frequency resource blocks that is closest to a start time of the Q time sub-pool(s) in time domain.

In one embodiment, frequency-domain resources comprised by any of the t time-frequency resource blocks are not completely the same as frequency-domain resources comprised by the first sub-band, the t being greater than 1, and the reference time-frequency resource block is one of the t time-frequency resource blocks whose corresponding start time is closest to that of the Q time sub-pool(s) in time domain.

Embodiment 10

Figure 10A:
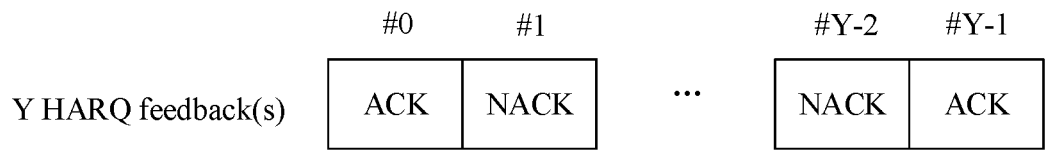
FIG. 10A-FIG. 10B respectively illustrate a schematic diagram of relations among J given first radio signal(s), J given second radio signal(s) and Q according to one embodiment of the present disclosure.
Figure 10B:
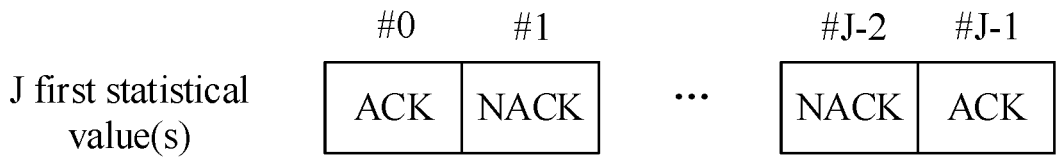

Embodiment 10 illustrates a schematic diagram of relations among J given first radio signal(s), J given second radio signal(s) and Q, as shown in FIG. 10.

In Embodiment 10, the first node in the present disclosure is a base station, and the J given first radio signal(s) respectively indicates(indicate) whether the J given second radio signal(s) is(are) correctly received; the J given second radio signal(s) comprises(comprise) Y sub-signal(s), and the J given first radio signal(s) indicates(indicate) whether any of the Y sub-signal(s) is correctly received, Y being a positive integer no less than J; whether the Y sub-signal(s) is(are) correctly received is used for determining the Q. The J given first radio signal(s) corresponds(correspond) to the reference first-type radio signal in the present disclosure, while the J given second radio signal(s) corresponds(correspond) to the reference second-type radio signal in the present disclosure, and the Y sub-signal(s) corresponds (correspond) to the W sub-signal(s) in the present disclosure, the J being equal to 1 and the Y being equal to the W; or, the J given first radio signals comprise the S fourth-type radio signal(s) and the reference first-type radio signal in the present disclosure, while the J given second radio signals comprise the S fifth-type radio signal(s) and the reference second-type radio signal in the present disclosure, and the Y sub-signals comprise the W1 sub-signal(s) and the W sub-signal(s) in the present disclosure, the J being equal to the S plus 1 and the Y being a sum of the W1 and the W1.

In one embodiment, the Y is equal to the J, the J given first radio signal(s) respectively indicating whether the Y sub-signal(s) is(are) correctly received.

In one embodiment, the Y is greater than the J, at least one given second radio signal of the J given second radio signal(s) comprises multiple sub-signals.

In one embodiment, the Y is greater than the J, any given second radio signal of the J given second radio signal(s) comprising multiple sub-signals.

In one embodiment, a first reference radio signal comprises Y2 sub-signal(s), and the first reference radio signal is any given second radio signal of the J given second radio signal(s), the Y2 sub-signal(s) belonging to the Y sub-signal(s).

In one subembodiment of the above embodiment, the Y2 is greater than 1, the Y2 sub-signals occupying same time-domain resources.

In one subembodiment of the above embodiment, the Y2 is greater than 1, at least one multicarrier symbol being occupied by each of the Y2 sub-signals.

In one subembodiment of the above embodiment, the Y2 is greater than 1, the Y2 sub-signals occupying same frequency-domain resources.

In one subembodiment of the above embodiment, the Y2 is greater than 1, at least one subcarrier being occupied by each of the Y2 sub-signals.

In one subembodiment of the above embodiment, the Y2 is a positive integer no greater than 2.

In one subembodiment of the above embodiment, the Y2 is equal to 1.

In one subembodiment of the above embodiment, the Y2 is equal to 2.

In one subembodiment of the above embodiment, the Y2 is equal to a number of codewords of the first reference radio signal.

In one subembodiment of the above embodiment, the first reference radio signal comprises Y2 codeword(s), the Y2 sub-signal(s) respectively corresponding to the Y2 codeword(s).

In one subembodiment of the above embodiment, the Y2 is greater than 1, the Y2 sub-signals respectively occupying different antenna ports or antenna port groups.

In one subembodiment of the above embodiment, one of the J given first radio signal(s) corresponding to the first reference radio signal comprises Y2 first sub-signal(s), the Y2 first sub-signal(s) being respectively used for determining whether the Y2 sub-signal(s) is(are) correctly received.

In one embodiment, a first ratio is equal to a ratio of a number of sub-signal(s) not having been correctly received out of the Y sub-signal(s) to the Y, the first ratio being used for determining the Q.

In one embodiment, the Embodiment 10A corresponds to a schematic diagram of relations among J given first radio signal(s), J given second radio signal(s) and Q, wherein the Y is equal to the J or the Y is greater than the J, the J given first radio signal(s) comprising a total of Y HARQ-ACK feedback(s), the Y HARQ-ACK feedback(s) respectively corresponding to the Y sub-signal(s) and any of the Y HARQ-ACK feedback(s) is of a value which is either an ACKnowledgement (ACK) or a Negative ACKnowledgement (NACK), and a first ratio is equal to a number of NACK(s) comprised by the Y HARQ-ACK feedback(s) to the Y.

In one embodiment, the Y is greater than the J, whether the Y sub-signals are correctly received is used for determining J first statistical value(s), the J first statistical value(s) respectively indicating whether the J given second radio signal(s) is(are) counted as being correctly received, and is(are) used for determining the Q.

In one subembodiment, a first reference radio signal is any given second radio signal of the J given second radio signal(s), sub-signal(s) comprised by the first reference radio signal out of the Y sub-signals is(are) correctly received, and the first reference radio signal is counted as being correctly received.

In one subembodiment, a first reference radio signal is any given second radio signal of the J given second radio signal(s), at least one of sub-signal(s) comprised by the first reference radio signal out of the Y sub-signals is not correctly received, and the first reference radio signal is counted as not being correctly received.

In one embodiment, the Y is greater than the J, whether the Y sub-signals are correctly received is used for determining J first statistical value(s), the J first statistical value(s) respectively indicating whether the J given second radio signal(s) is(are) counted as being correctly received, a first ratio is equal to a ratio of a number of given second radio signal(s) counted as not being correctly received out of the J given second radio signal(s) respectively indicated by the J first statistical value(s) to the J, the first ratio being used for determining the Q.

In one embodiment, the Embodiment 10B corresponds to a schematic diagram of relations among J given first radio signal(s), J given second radio signal(s) and Q, wherein the Y is greater than the J, the J given first radio signal(s) comprising a total of Y HARQ-ACK feedbacks, the Y HARQ-ACK feedbacks respectively corresponding to the Y sub-signals and any of the Y HARQ-ACK feedbacks is of a value which is either an ACK or a NACK; the Y HARQ-ACK feedbacks are used for determining J first statistical value(s) and any of the J first statistical value(s) is of a value which is either an ACK or a NACK; and a first ratio is equal to a number of NACK(s) comprised by the J first statistical value(s) to the J.

Embodiment 11

Embodiment 11 illustrates a schematic diagram of relations among J given third radio signal(s), J given fourth radio signal(s) and Q, as shown in FIG. 11.

In Embodiment 11, the first node in the present disclosure is a UE, the J given third radio signal(s) respectively comprises(comprise) J piece(s) of second information, the J piece(s) of second information respectively comprising scheduling information of the J given fourth radio signal(s); the J given fourth radio signal(s) comprises(comprise) Z sub-signal(s), and the J piece(s) of second information indicates(indicate) whether any of the Z sub-signal(s) comprises new data, Z being a positive integer no less than the J; whether the Z sub-signal(s) comprises(comprise) new data is used for determining the Q. The J given third radio signal(s) corresponds(correspond) to the reference first-type radio signal in the present disclosure, while the J given fourth radio signal(s) corresponds(correspond) to the reference second-type radio signal in the present disclosure, and the Z sub-signal(s) corresponds(correspond) to the V sub-signal(s) in the present disclosure, the J being equal to 1 and the Z being equal to the V; or, the J given third radio signals comprise the S fourth-type radio signal(s) and the reference first-type radio signal in the present disclosure, while the J given fourth radio signals comprise the S fifth-type radio signal(s) and the reference second-type radio signal in the present disclosure, and the Z sub-signals comprise the V1 sub-signal(s) and the V sub-signal(s) in the present disclosure, the J being equal to the S plus 1, and the Z being a sum of the V1 and the V.

In one embodiment, each of the J piece(s) of second information is carried by a dynamic signaling.

In one embodiment, each of the J piece(s) of second information is carried by a physical layer signaling.

In one embodiment, each of the J piece(s) of second information is carried by a dynamic signaling used for UpLink Grant.

In one embodiment, each of the J piece(s) of second information is carried by a DCI signaling.

In one embodiment, each of the J piece(s) of second information is carried by an UpLink Grant DCI signaling.

In one embodiment, given second information is any of the J piece(s) of second information, the given second information comprises a first field, and the first field comprised in the given second information indicates whether each sub-signal comprised by a corresponding given fourth radio signal of the J given fourth radio signal(s) comprises new data.

In one subembodiment, the first field comprised in the given second information is a New Data Indicator (NDI).

In one subembodiment, the first field comprised in the given second information comprises a positive integer number of bit(s).

In one subembodiment, the first field comprised in the given second information comprises 1 bit.

In one subembodiment, the first field comprised in the given second information comprises 2 bits.

In one embodiment, the Z is equal to the J, the J given third radio signal(s) respectively indicating whether the Z sub-signal(s) is(are) correctly received.

In one embodiment, the Z is equal to the J, the J piece(s) of second information respectively indicating whether the Z sub-signal(s) is(are) correctly received.

In one embodiment, the Z is greater than the J, at least a given fourth radio signal of the J given fourth radio signal(s) comprises multiple sub-signals.

In one embodiment, the Z is greater than the J, any of the J given fourth radio signal(s) comprises multiple sub-signals.

In one embodiment, a second reference radio signal comprises Z2 sub-signal(s), and the second reference radio signal is any of the J given fourth radio signal(s), the Z2 sub-signal(s) belonging to the Z sub-signal(s).

In one subembodiment, the Z2 is greater than 1, the Z2 sub-signals occupying same time-domain resources.

In one subembodiment, the Z2 is greater than 1, at least one multicarrier symbol being occupied by each of the Z2 sub-signals.

In one subembodiment, the Z2 is greater than 1, the Z2 sub-signals occupying same frequency-domain resources.

In one subembodiment, the Z2 is greater than 1, at least one subcarrier being occupied by each of the Z2 sub-signals.

In one subembodiment of the above embodiment, the Z2 is a positive integer no greater than 2.

In one subembodiment of the above embodiment, the Z2 is equal to 1.

In one subembodiment of the above embodiment, the Z2 is equal to 2.

In one subembodiment of the above embodiment, the Z2 is equal to a number of codewords of the second reference radio signal.

In one subembodiment of the above embodiment, the second reference radio signal comprises Z2 codeword(s), the Z2 sub-signal(s) respectively corresponding to the Z2 codeword(s).

In one subembodiment of the above embodiment, the Z2 is greater than 1, the Z2 sub-signals respectively occupying different antenna ports or antenna port groups.

In one subembodiment of the above embodiment, one of the J piece(s) of second information corresponding to the second reference radio signal indicates whether each of the Z2 sub-signal(s) comprises(comprise) new data.

In one embodiment, a first value is equal to a number of sub-signal(s) comprising new data out of the Z sub-signal(s), the first value being used for determining the Q.

In one embodiment, the Embodiment 11A corresponds to a schematic diagram of relations among J given third radio signal(s), J given fourth radio signal(s) and the Q, wherein a first value is equal to a number of sub-signal(s) comprising new data out of the Z sub-signal(s).

In one embodiment, a first value is equal to a ratio of a number of sub-signal(s) comprising new data out of the Z sub-signal(s) to the Z, the first value being used for determining the Q.

In one embodiment, the Embodiment 11B corresponds to a schematic diagram of relations among J given third radio signal(s), J given fourth radio signal(s) and the Q, wherein a first value is equal to a ratio of a number of sub-signal(s) comprising new data out of the Z sub-signal(s) to the Z.

In one embodiment, the Z is greater than the J, whether the Z sub-signals comprise new data is used for determining J second statistical value(s), the J second statistical value(s) respectively indicating whether the J given fourth radio signal(s) is(are) counted as comprising new data, and the J second statistical value(s) is(are) used for determining the Q.

In one subembodiment, a second reference radio signal is any given fourth radio signal of the J given fourth radio signal(s), each sub-signal comprised by the second reference radio signal of the Z sub-signals comprises new data, and the second reference radio signal is counted as comprising new data.

In one subembodiment, a second reference radio signal is any given fourth radio signal of the J given fourth radio signal(s), at least one of sub-signal(s) comprised by the second reference radio signal of the Z sub-signals comprises new data, and the second reference radio signal is counted as comprising new data.

In one subembodiment, a second reference radio signal is any given fourth radio signal of the J given fourth radio signal(s), at least one of sub-signal(s) comprised by the second reference radio signal of the Z sub-signals does not comprise new data, and the second reference radio signal is counted as comprising no new data.

In one embodiment, a first value is equal to a number of given fourth radio signal(s) comprising new data out of the J given fourth radio signal(s), and the first value is used for determining the Q.

In one embodiment, the Embodiment 11C corresponds to a schematic diagram of relations among J given third radio signal(s), J given fourth radio signal(s) and the Q, wherein a value of any of the J second statistical value(s) either comprises new data or comprises no new data, and a first value is equal to a number of second statistical value(s) comprising new data out of the J second statistical value(s).

In one embodiment, a first value is equal to a ratio of a number of given fourth radio signal(s) comprising new data out of the J given fourth radio signal(s) to the J, and the first value is used for determining the Q.

In one embodiment, the Embodiment 11D corresponds to a schematic diagram of relations among J given third radio signal(s), J given fourth radio signal(s) and the Q, wherein a value of any of the J second statistical value(s) either comprises new data or comprises no new data, and a first value is equal to a ratio of a number of second statistical value(s) comprising new data out of the J second statistical value(s) to the J.

Embodiment 12

Figure 12:
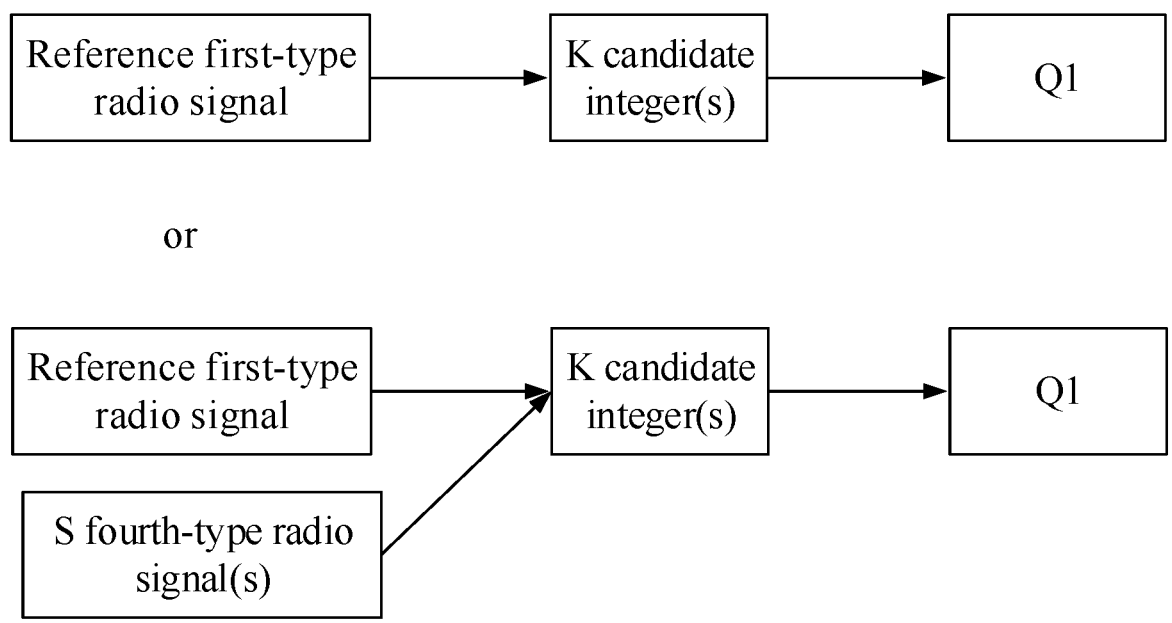
FIG. 12 illustrates a schematic diagram of a reference first-type radio signal being used for determining Q according to one embodiment of the present disclosure.

Embodiment 12 illustrates a schematic diagram of a reference first-type radio signal being used for determining Q, as shown in FIG. 12.

In Embodiment 12, the reference first-type radio signal is used for determining K candidate integer(s), Q1 being one of the K candidate integer(s); each of Q1 detection value(s) out of the Q detection value(s) is lower than the first threshold in the present disclosure, K being a positive integer, and the Q1 being a positive integer no greater than the Q.

In one embodiment, the reference first-type radio signal and the S fourth-type radio signal(s) in the present disclosure are jointly used for determining the K candidate integer(s).

In one embodiment, the first node in the present disclosure randomly selects a value of the Q1 from the K candidate integers.

In one embodiment, the first node in the present disclosure selects any of the K candidate integers as a value of the Q1 with equal probability.

In one embodiment, the K candidate integers are 0, 1, 2 . . . , and K−1.

In one embodiment, the K is CWp, which refers to contention window size; the specific definition of the CWp can be found in 3GPP TS36.213, section 15.

In one embodiment, any of the K candidate integer(s) is a non-negative integer.

In one embodiment, the K candidate integer(s) comprises (comprise) 0.

In one embodiment, any two of the K candidate integers are unequal.

In one embodiment, the K is a positive integer greater than 1.

Embodiment 13

Embodiment 13 illustrates a schematic diagram of J given fifth radio signal(s) being used for determining K candidate integer(s), as shown in FIG. 13.

In Embodiment 13, the K is a positive integer in a first integer set, the first integer set comprising a positive integer number of positive integer(s); when a first condition is met, the K is equal to K1, or when a first condition is not met, the K is equal to a smallest positive integer in the first integer set; when K0 is not a greatest positive integer in the first integer set, the K1 is equal to a smallest positive integer greater than the K0 in the first integer set, otherwise the K1 is equal to the K0; the K0 is a positive integer in the first integer set. The Q1 in the present disclosure is one of the K candidate integer(s); and each of Q1 detection value(s) of the Q detection value(s) in the present disclosure is lower than the first threshold in the present disclosure; the first node in the present disclosure is a base station; the first condition is as follows: a given ratio corresponding to J given fifth radio signal(s) is no less than a first target value; the J given fifth radio signal(s) corresponds(correspond) to the reference first-type radio signal in the present disclosure, or, the J given fifth radio signals correspond to the reference first-type radio signal and the S fourth-type radio signal(s) in the present disclosure; the given ratio corresponds to the first ratio in the present disclosure.

In FIG. 13, the first integer set is {15, 31, 63}, the K0 being equal to 31 and the K1 being equal to 63. When the given ratio is no less than the first target value, the K is equal to the K1; otherwise, the K is equal to 15.

In one embodiment, a priority class for the third-type radio signal in the present disclosure is used for determining the first integer set.

In one subembodiment of the above embodiment, the priority class for the third-type radio signal is 3.

In one embodiment, the K0 is CWp in a latest Cat4 LBT process before the Q time sub-pool(s), the CWp referring to contention window size, and the detailed definition of the CWp can be found in 3GPP TS36.213, section 15.

In one embodiment, the first target value is pre-defined.

In one embodiment, the first target value is a non-negative real number.

In one embodiment, the first target value is equal to 80%.

Embodiment 14

Embodiment 14 illustrates another schematic diagram of J given sixth radio signal(s) being used for determining K candidate integer(s), as shown in FIG. 14.

In Embodiment 14, the K is a positive integer in a first integer set, the first integer set comprising a positive integer number of positive integer(s); when a second condition is met, the K is equal to K1, or when a second condition is not met, the K is equal to a smallest positive integer in the first integer set; when K0 is not a greatest positive integer in the first integer set, the K1 is equal to a smallest positive integer greater than the K0 in the first integer set, otherwise the K1 is equal to the K0; the K0 is a positive integer in the first integer set. The Q1 in the present disclosure is one of the K candidate integer(s); and each of Q1 detection value(s) of the Q detection value(s) in the present disclosure is lower than the first threshold in the present disclosure.

In Embodiment 14, the first node in the present disclosure is a UE; the second condition is that a given value to which the J given sixth radio signal(s) is(are) used to correspond is no greater than a second target value. The J given sixth radio signal(s) corresponds(correspond) to the reference first-type radio signal in the present disclosure, or, J given sixth radio signals correspond to the reference first-type radio signal and the S fourth-type radio signal(s) in the present disclosure; the given value corresponds to the first value in the present disclosure.

In FIG. 14, the first integer set is {15, 31, 63}, the K0 being equal to 63 and the K1 being a greatest positive integer in the first integer set, that is, the K1 is equal to the K0. When the given value is no greater than the second target value, the K is equal to the K0; otherwise, the K is equal to 15.

In one embodiment, the second target value is pre-defined.

In one embodiment, the second target value is a non-negative real number.

In one embodiment, the second target value is a non-negative integer.

In one embodiment, the second target value is equal to 0.

Embodiment 15

Figure 15:
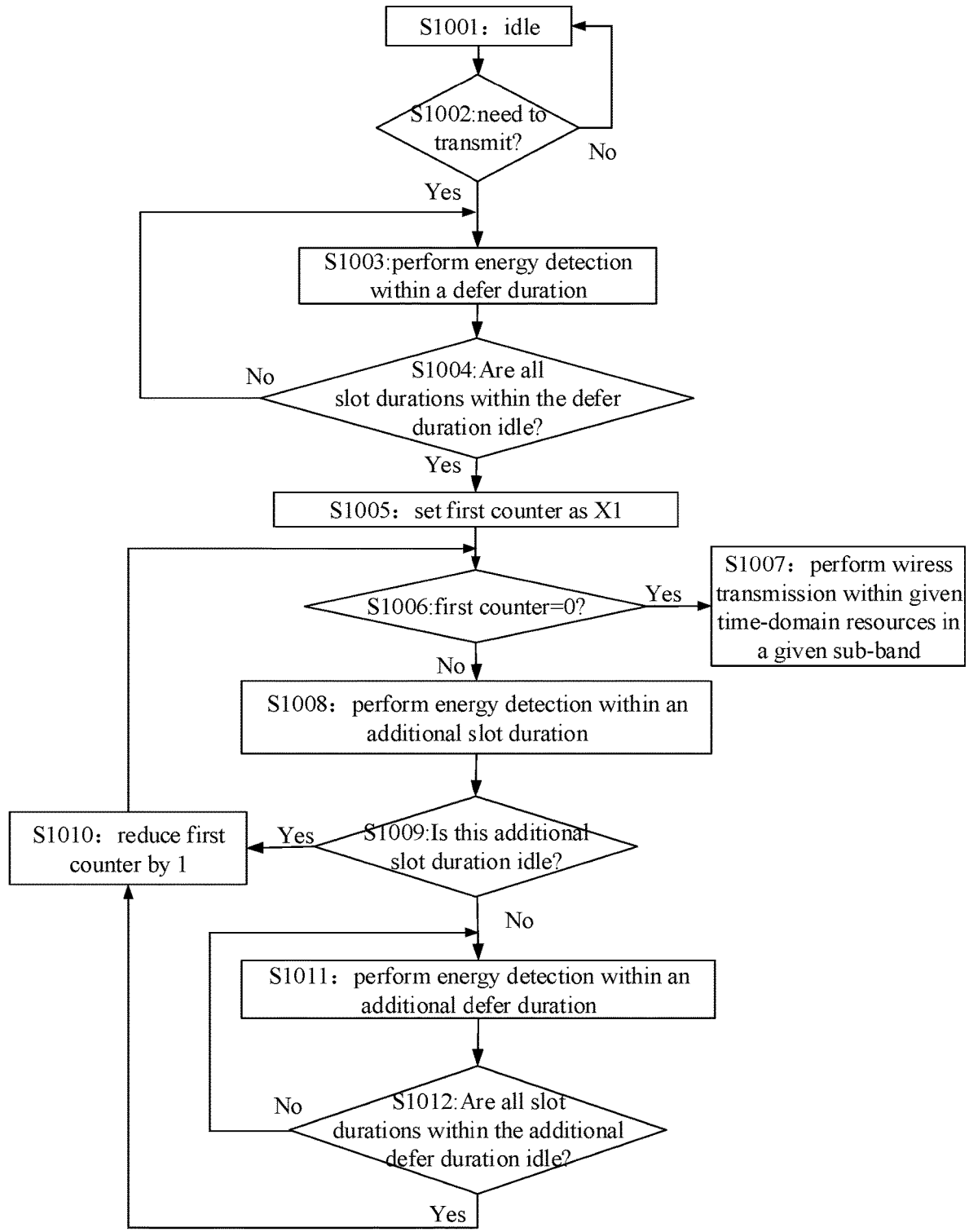
FIG. 15 illustrates a schematic diagram of a given access detection being used for determining whether wireless transmission is performed within given time-domain resources in a given sub-band according to one embodiment of the present disclosure.

Embodiment 15 illustrates a schematic diagram of a given access detection being used for determining whether wireless transmission is performed within given time-domain resources in a given sub-band; as shown in FIG. 15.

In Embodiment 15, the given access detection comprises performing X energy detection(s) respectively in X time sub-pool(s) on the given sub-band, through which X detection value(s) is(are) obtained, X being a positive integer; an end time of the X time sub-pool(s) is no later than a given time, the given time being a start time of given time-domain resources in the given sub-band. The given sub-band corresponds to the first sub-band in the present disclosure, and the given time-domain resources in the given sub-band correspond to time-domain resources occupied by the third-type radio signal in the present disclosure, the X corresponding to the Q in the present disclosure, and X1 corresponding to the Q1 in the present disclosure; or, the given access detection corresponds to any access detection of the T access detections in the present disclosure, the given sub-band corresponds to one of the T sub-bands in the present disclosure corresponding to the given access detection, and given time-domain resources in the given sub-band correspond to time-domain resources comprised by one of the T time-frequency resource blocks in the present disclosure corresponding to the given sub-band. The process of the given access detection may be depicted by the flowchart in FIG. 15.

In FIG. 15, the base station in the present disclosure is idle in step S1001, and determines whether there is need to transmit in step S1002; performs energy detection in a defer duration in step S1003; and determines in step S1004 whether all slot durations within the defer duration are idle, if yes, move forward to step S1005 to set a first counter as X1, X1 being an integer no greater than the X; otherwise, go back to step S1004; the base station determines whether the first counter is 0 in step S1006, if yes, move forward to step S1007 to perform wireless transmission in given time-domain resources in the given sub-band; otherwise move forward to step S1008 to perform energy detection in an additional slot duration; and determines in step S1009 whether the additional slot durations is idle, if yes, move forward to step S1010 to reduce the first counter by 1 and then go back to step S1006; otherwise, move forward to step S1011 to perform energy detection in an additional defer duration; the base station then determines in step S1012 whether all slot durations within the additional defer duration are idle, if yes, move back to step S1010; otherwise, go back to step S1011.

In Embodiment 15, the first counter in FIG. 15 is cleared to 0 ahead of the given time, then a result of the given access detection is that a channel is idle, so wireless transmission can be performed within given time-domain resources in the given sub-band; otherwise, wireless transmission in the given time-domain resources in the given sub-band is dropped. The condition for clearing the first counter is that each of X1 detection value(s) out of the X detection value(s) respectively corresponding to X1 time sub-pool(s) of the X time sub-pool(s) is lower than the first reference threshold, a start time of each of the X1 time sub-pool(s) is behind the step S1005 in FIG. 15.

In one embodiment, the X time sub-pool(s) comprises (comprise) all defer durations in FIG. 15.

In one embodiment, the X time sub-pool(s) comprises (comprise) part of defer durations in FIG. 15.

In one embodiment, the X time sub-pool(s) comprises (comprise) all defer durations and all additional slot durations in FIG. 15.

In one embodiment, the X time sub-pool(s) comprises (comprise) all defer durations and part of additional slot durations in FIG. 15.

In one embodiment, the X time sub-pool(s) comprises (comprise) all defer durations, all additional slot durations and all additional defer durations in FIG. 15.

In one embodiment, the X time sub-pool(s) comprises (comprise) all defer durations, part of additional slot durations and all additional defer durations in FIG. 15.

In one embodiment, the X time sub-pool(s) comprises (comprise) all defer durations, part of additional slot durations and part of additional defer durations in FIG. 15.

In one embodiment, any of the X time sub-pool(s) lasts either 16 μs or 9 μs.

In one embodiment, any slot duration within a given time duration is one of the X time sub-pool(s); the given time duration is any duration among all defer durations, all additional slot durations, and all additional defer durations comprised in FIG. 15.

In one embodiment, performing energy detection within a given time duration refers to performing energy detection in all slot durations within the given time duration; the given time duration is any duration among all defer durations, all additional slot durations, and all additional defer durations comprised in FIG. 15.

In one embodiment, a given time duration being determined as idle through energy detection means that all slot durations within the given duration are determined to be idle through energy detection; the given time duration is any duration among all defer durations, all additional slot durations, and all additional defer durations comprised in FIG. 15.

In one embodiment, a given slot duration being determined as idle through energy detection means that the base station senses power of all radio signals on the given sub-band in a given time unit and then averages in time, through which a received power obtained is lower than the first reference threshold; the given time unit is a consecutive duration in the given slot duration.

In one subembodiment of the above embodiment, the given time unit lasts no shorter than 4 μs.

In one embodiment, a given slot duration being determined as idle through energy detection means that the base station senses energy of all radio signals on the given sub-band in a given time unit and then averages in time, through which a received energy obtained is lower than the first reference threshold; the given time unit is a consecutive duration in the given slot duration.

In one subembodiment of the above embodiment, the given time unit lasts no shorter than 4 μs.

In one embodiment, performing energy detection within a given time duration refers to performing energy detection in time sub-pool(s) within the given time duration; the given time duration is any duration among all defer durations, all additional slot durations, and all additional defer durations comprised in FIG. 15, and each of the time sub-pool(s) belongs to the X time sub-pool(s).

In one embodiment, a given time duration being determined as idle through energy detection means that each of detection value(s) obtained through energy detection on time sub-pool(s) comprised by the given time duration is lower than the first reference threshold; the given time duration is any duration among all defer durations, all additional slot durations, and all additional defer durations comprised in FIG. 15, each of the time sub-pool(s) belongs to the X time sub-pool(s) and each of the detection value(s) belongs to the X detection value(s).

In one embodiment, a defer duration lasts as long as (16+Y1*9) μs, Y1 being a positive integer.

In one subembodiment, a defer duration comprises Y1+1 time sub-pools of the X time sub-pools.

In one reference embodiment of the above subembodiment, a first time sub-pool of the Y1+1 time sub-pools lasts 16 μs, while each of the other Y1 time sub-pool(s) lasts 9 μs.

In one subembodiment, the given priority class is used for determining the Y1.

In one reference embodiment of the above subembodiment, the given priority class is Channel Access Priority Class, for the definition of the Channel Access Priority Class, refer to 3GPP TS36.213, section 15.

In one subembodiment of the above embodiment, the Y1 belongs to a set of 1, 2, 3, and 7.

In one embodiment, a defer duration comprises multiple slot durations.

In one subembodiment, a first slot duration and a second slot duration of the multiple slot durations are non-consecutive.

In one subembodiment, a first slot duration and a second slot duration of the multiple slot durations are spaced by a time interval of 7 ms.

In one embodiment, an additional defer duration lasts as long as (16+Y2*9) μs, Y2 being a positive integer.

In one subembodiment, an additional defer duration comprises Y2+1 time sub-pools of the X time sub-pools.

In one reference embodiment of the above subembodiment, a first time sub-pool of the Y2+1 time sub-pools lasts 16 μs, while each of the other Y2 time sub-pool(s) lasts 9 μs.

In one subembodiment, the given priority class is used for determining the Y2.

In one subembodiment of the above embodiment, the Y2 belongs to a set of 1, 2, 3, and 7.

In one embodiment, a defer duration lasts as long as an additional defer duration.

In one embodiment, the Y1 is equal to the Y2.

In one embodiment, an additional defer duration comprises multiple slot durations.

In one subembodiment, a first slot duration and a second slot duration of the multiple slot durations are non-consecutive.

In one subembodiment, a first slot duration and a second slot duration of the multiple slot durations are spaced by a time interval of 7 ms.

In one embodiment, a slot duration lasts 9 μs.

In one embodiment, a slot duration is one of the X time sub-pool(s).

In one embodiment, an additional slot duration lasts 9 μs.

In one embodiment, an additional slot comprises one of the X time sub-pool(s).

In one embodiment, the X energy detection(s) is(are) used for determining whether the given sub-band is idle.

In one embodiment, the X energy detection(s) is(are) used for determining whether the given sub-band can be used by the base station for transmitting a radio signal.

In one embodiment, the X detection value(s) is(are) measured by dBm.

In one embodiment, the X detection value(s) is(are) measured by mW.

In one embodiment, the X detection value(s) is(are) measured by Joule (J).

In one embodiment, the X1 is less than the X.

In one embodiment, the X is greater than 1.

In one embodiment, the first reference threshold is measured by dBm.

In one embodiment, the first reference threshold is measured by mW.

In one embodiment, the first reference threshold is measured by J.

In one embodiment, the first reference threshold is equal to or less than −72 dBm.

In one embodiment, the first reference threshold is any value equal to or less than a first given value.

In one subembodiment of the above embodiment, the first given value is pre-defined.

In one subembodiment of the above embodiment, the first given value is configured by a higher-layer signaling.

In one embodiment, the first reference threshold is liberally selected by the base station given that the first reference threshold is equal to or less than a first given value.

In one subembodiment of the above embodiment, the first given value is pre-defined.

In one subembodiment of the above embodiment, the first given value is configured by a higher-layer signaling.

In one embodiment, the X energy detection(s) is(are) energy detection(s) in a process of Cat 4 LBT, the X1 is CWp in the Cat 4 LBT process, the CWp referring to contention window size, and the detailed definition of the CWp can be found in 3GPP TS36.213, section 15.

In one embodiment, at least one detection value of the X detection values not belonging to the X1 detection value(s) is lower than the first reference threshold.

In one embodiment, at least one detection value of the X detection values not belonging to the X1 detection value(s) is no lower than the first reference threshold.

In one embodiment, any two time sub-pools of the X1 time sub-pools are of equal duration.

In one embodiment, at least two time sub-pools of the X1 time sub-pools are of unequal durations.

In one embodiment, the X1 time sub-pool(s) comprises (comprise) a latest time sub-pool of the X time sub-pools.

In one embodiment, the X1 time sub-pool(s) comprises (comprise) only slot duration(s) in an eCCA.

In one embodiment, the X time sub-pools comprise the X1 time sub-pool(s) and X2 time sub-pool(s), any of the X2 time sub-pool(s) not belonging to the X1 time sub-pool(s); X2 is a positive integer no greater than the X minus the X1.

In one subembodiment of the above embodiment, the X2 time sub-pool(s) comprises(comprise) slot duration(s) in an initial CCA.

In one subembodiment of the above embodiment, positions of the X2 time sub-pools among the X time sub-pools are consecutive.

In one subembodiment of the above embodiment, at least one of the X2 time sub-pool(s) corresponds to a detection value lower than the first reference threshold.

In one subembodiment of the above embodiment, at least one of the X2 time sub-pool(s) corresponds to a detection value not lower than the first reference threshold.

In one subembodiment of the above embodiment, the X2 time sub-pool(s) comprises(comprise) all slot durations within all defer durations.

In one subembodiment of the above embodiment, the X2 time sub-pool(s) comprises(comprise) all slot durations within at least one additional defer duration.

In one subembodiment of the above embodiment, the X2 time sub-pool(s) comprises(comprise) at least one additional slot duration.

In one subembodiment of the above embodiment, the X2 time sub-pool(s) comprises(comprise) all slot durations within all additional slot durations and all defer durations in FIG. 15 determined to be non-idle through energy detection.

In one embodiment, the X1 time sub-pool(s) respectively belongs(belong) to X1 sub-pool set(s), any of the X1 sub-pool set(s) comprises a positive integer number of time sub-pool(s) of the X time sub-pool(s); any time sub-pool out of the X1 sub-pool set(s) corresponds to a detection value lower than the first reference threshold.

In one subembodiment of the above embodiment, at least one sub-pool set of the X1 sub-pool set(s) comprises 1 time sub-pool.

In one subembodiment of the above embodiment, at least one sub-pool set of the X1 sub-pool set(s) comprises more than 1 time sub-pool.

In one subembodiment of the above embodiment, at least two sub-pool sets of the X1 sub-pool sets comprise unequal numbers of time sub-pools.

In one subembodiment of the above embodiment, none of the X time sub-pool(s) belongs to two of the X1 sub-pool sets simultaneously.

In one subembodiment of the above embodiment, each time sub-pool comprised in any of the X1 sub-pool set(s) belongs to a same additional defer duration or additional slot duration determined as idle through energy detection.

In one subembodiment of the above embodiment, at least one of time sub-pool(s) of the X time sub-pools not belonging to the X1 sub-pool set(s) corresponds to a detection value lower than the first reference threshold.

In one subembodiment of the above embodiment, at least one of time sub-pool(s) of the X time sub-pools not belonging to the X1 sub-pool set(s) corresponds to a detection value no lower than the first reference threshold.

Embodiment 16

Figure 16:
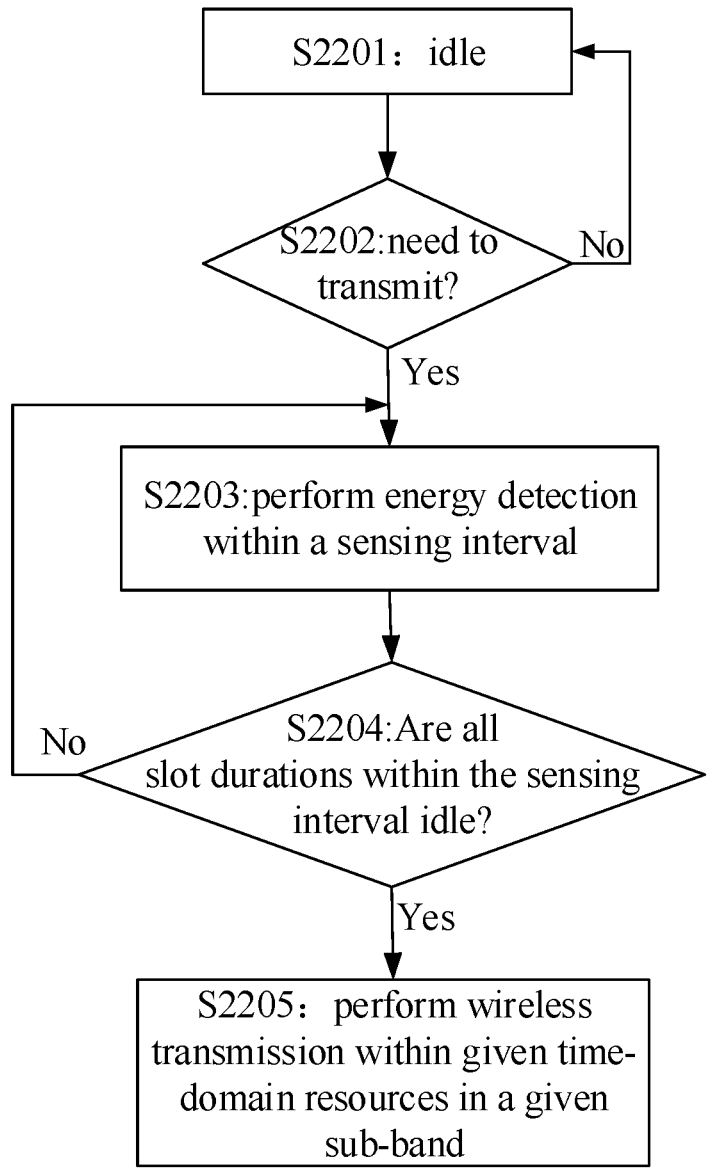
FIG. 16 illustrates a schematic diagram of a given access detection being used for determining whether wireless transmission is performed within given time-domain resources in a given sub-band according to another embodiment of the present disclosure.

Embodiment 16 illustrates another schematic diagram of a given access detection being used for determining whether wireless transmission is performed within given time-domain resources in a given sub-band; as shown in FIG. 16.

In Embodiment 16, the given access detection comprises performing X energy detection(s) respectively in X time sub-pool(s) on the given sub-band, through which X detection value(s) is(are) obtained, X being a positive integer; an end time of the X time sub-pool(s) is no later than a given time, the given time being a start time of given time-domain resources in the given sub-band. The given sub-band corresponds to the first sub-band in the present disclosure, and the given time-domain resources in the given sub-band correspond to time-domain resources occupied by the third-type radio signal in the present disclosure, the X corresponding to the Q in the present disclosure, and X1 corresponding to the Q1 in the present disclosure; or, the given access detection corresponds to any access detection of the T access detections in the present disclosure, the given sub-band corresponds to one of the T sub-bands in the present disclosure corresponding to the given access detection, and given time-domain resources in the given sub-band correspond to time-domain resources comprised by one of the T time-frequency resource blocks in the present disclosure corresponding to the given sub-band. The process of the given access detection may be depicted by the flowchart in FIG. 16.

In Embodiment 16, the UE in the present disclosure is idle in step S2201, and determines whether there is need to transmit in step S2202; performs energy detection in a sensing interval in step S2203; and determines in step S2204 whether all slot durations within the sensing interval are idle, if yes, move forward to step S2205 to perform wireless transmission in given time-domain resources in the given sub-band; otherwise, go back to step S2203.

In Embodiment 16, a first given duration comprises a positive integer number of time sub-pool(s) of the X time sub-pool(s), and the first given duration is any duration out of all sensing intervals comprised in FIG. 16. A second given duration comprises a time sub-pool of the X1 time sub-pool(s), and the second given duration is a sensing interval in FIG. 16 determined to be idle through energy detection.

In one embodiment, the detailed definition of the sensing interval can be found in 3GPP TS36.213, section 15.2.

In one embodiment, the X1 is equal to 2.

In one embodiment, the X1 is equal to the X.

In one embodiment, a sensing interval lasts 25 μs.

In one embodiment, a sensing interval comprises 2 slot durations, and the 2 slot durations are non-consecutive in time domain.

In one subembodiment of the above embodiment, the 2 slot durations are spaced by a time interval of 7 μs.

In one embodiment, the X time sub-pool(s) comprises (comprise) listening time in Category 2 LBT.

In one embodiment, the X time sub-pool(s) comprises (comprise) slots comprised in a sensing interval in Type 2 UL channel access procedure, for the detailed definition of the sensing interval, refer to 3GPP TS36.213, section 15.2.

In one subembodiment of the above embodiment, the sensing interval lasts 25 μs.

In one embodiment, the X time sub-pool(s) comprises (comprise) Tf and Tsl comprised in a sensing interval in Type 2 UL channel access procedure, for the detailed definition of the Tf and the Tsl, refer to 3GPP TS36.213, section 15.2.

In one subembodiment, the Tf lasts 16 μs.

In one subembodiment, the Tsl lasts 9 μs.

In one embodiment, a first time sub-pool of the X1 time sub-pools lasts 16 μs, and a second time sub-pool of the X1 time sub-pools lasts 9 μs, the X1 being 2.

In one embodiment, each of the X1 time sub-pools lasts 9 μs; a time interval between a first time sub-pool and a second time sub-pool of the X1 time sub-pools is 7 μs, the X1 being 2.

Embodiment 17

Figure 17:
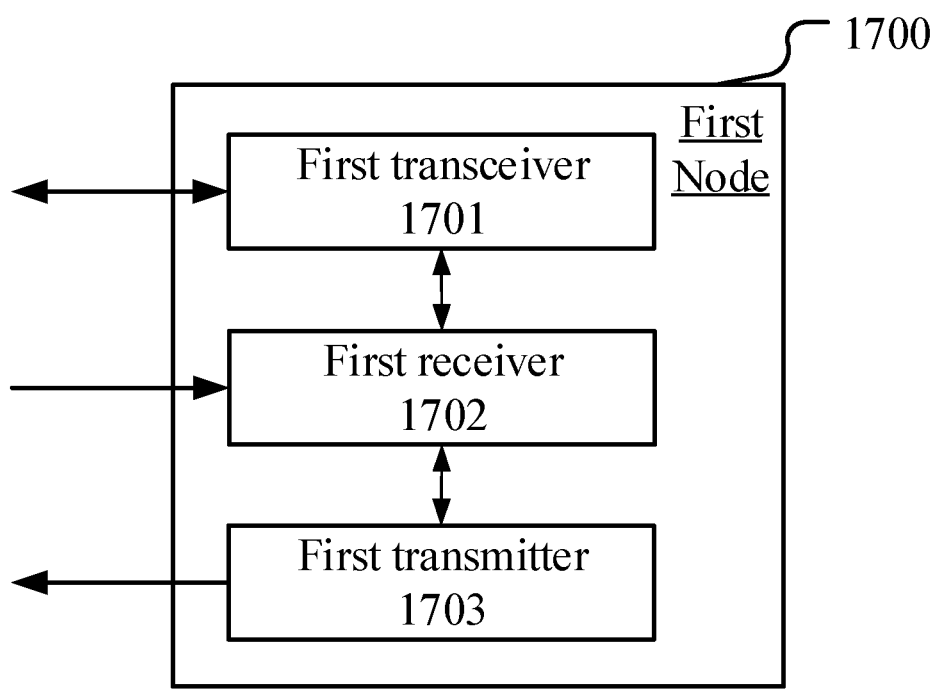
FIG. 17 illustrates a structure block diagram of a processing device in a first node according to one embodiment of the present disclosure.

Embodiment 17 illustrates a structure block diagram of a processing device in a first node, as shown in FIG. 17. In FIG. 17, a first node's processing device 1700 comprises a first transceiver 1701, a first receiver 1702 and a first transmitter 1703.

In one embodiment, the first node is a UE, and the first transceiver 1701 comprises the transmitter/receiver 456, the transmitting processor 455, the receiving processor 452 and the controller/processor 490 in Embodiment 4.

In one embodiment, the first node is a UE, and the first transceiver 1701 comprises at least the first three of the transmitter/receiver 456, the transmitting processor 455, the receiving processor 452 and the controller/processor 490 in Embodiment 4.

In one embodiment, the first node is a UE, and the first receiver 1702 comprises the receiver 456, the receiving processor 452 and the controller/processor 490 in Embodiment 4.

In one embodiment, the first node is a UE, and the first receiver 1702 comprises at least the first two of the receiver 456, the receiving processor 452 and the controller/processor 490 in Embodiment 4.

In one embodiment, the first node is a UE, and the first transmitter 1703 comprises the transmitter 456, the transmitting processor 455 and the controller/processor 490 in Embodiment 4.

In one embodiment, the first node is a UE, and the first transmitter 1703 comprises at least the first two of the transmitter 456, the transmitting processor 455 and the controller/processor 490 in Embodiment 4.

In one embodiment, the first node is a base station, and the first transceiver 1701 comprises the transmitter/receiver 416, the transmitting processor 415, the receiving processor 412 and the controller/processor 440 in Embodiment 4.

In one embodiment, the first node is a base station, and the first transceiver 1701 comprises at least the first three of the transmitter/receiver 416, the transmitting processor 415, the receiving processor 412 and the controller/processor 440 in Embodiment 4.

In one embodiment, the first node is a base station, and the first receiver 1702 comprises the receiver 416, the receiving processor 412 and the controller/processor 440 in Embodiment 4.

In one embodiment, the first node is a base station, and the first receiver 1702 comprises at least the first two of the receiver 416, the receiving processor 412 and the controller/processor 440 in Embodiment 4.

In one embodiment, the first node is a base station, and the first transmitter 1703 comprises the transmitter 416, the transmitting processor 415 and the controller/processor 440 in Embodiment 4.

In one embodiment, the first node is a base station, and the first transmitter 1703 comprises at least the first two of the transmitter 416, the transmitting processor 415 and the controller/processor 440 in Embodiment 4.

The first transceiver 1701 receives T first-type radio signals, T being a positive integer greater than 1; and performs T access detections respectively on T sub-bands, and transmits T second-type radio signals respectively in T time-frequency resource blocks.

The first receiver 1702 performs Q energy detection(s) respectively in Q time sub-pool(s) on a first sub-band, through which Q detection value(s) is(are) obtained, Q being a positive integer.

In Embodiment 17, the T sub-bands comprise at least one same frequency point, or the T sub-bands belong to a same carrier; at least one sub-band of the T sub-bands is different from the first sub-band; the T first-type radio signals are respectively associated with the T second-type radio signals; a reference first-type radio signal is one of the T first-type radio signals, the Q is related only to the reference first-type radio signal of the T first-type radio signals; the T access detections are respectively used for determining transmissions of the T second-type radio signals; a reference sub-band is one of the T sub-bands corresponding to the reference first-type radio signal, and a reference time-frequency resource block is one of the T time-frequency resource blocks corresponding to the reference first-type radio signal; selection of the reference time-frequency resource block is related to at least one of the first sub-band or the reference sub-band; the first node is a base station, or the first node is a UE.

In one embodiment, a bandwidth of the reference sub-band is equal to a bandwidth of a carrier to which the reference sub-band belongs.

In one embodiment, each of t time-frequency resource block(s) out of the T time-frequency resource blocks comprises the first sub-band, t being a positive integer no greater than the T; the reference time-frequency resource block is one of the t time-frequency resource block(s).

In one embodiment, each of t time-frequency resource block(s) out of the T time-frequency resource blocks comprises the first sub-band, t being a positive integer no greater than the T; frequency-domain resources respectively comprised by t1 time-frequency resource block(s) of the t time-frequency resource block(s) are the same as frequency-domain resources comprised by the first sub-band, wherein t1 is a positive integer no greater than the t, and the reference time-frequency resource block is one of the t1 time-frequency resource block(s); or, frequency-domain resources comprised by any of the t time-frequency resource block(s) are not completely the same as frequency-domain resources comprised by the first sub-band, and the reference time-frequency resource block is one of the t time-frequency resource block(s).

In one embodiment, the first node is a base station, and the T first-type radio signals respectively indicate whether the T second-type radio signals are correctly received; a reference second-type radio signal is one of the T second-type radio signals associated with the reference first-type radio signal, and the reference second-type radio signal comprises W sub-signal(s), W being a positive integer; whether the W sub-signal(s) is(are) correctly received is used for determining the Q.

In one embodiment, the first node is a UE, and the T first-type radio signals respectively comprise scheduling information of the T second-type radio signals; a reference second-type radio signal is one of the T second-type radio signals associated with the reference first-type radio signal, and the reference second-type radio signal comprises V sub-signal(s), V being a positive integer; the reference first-type radio signal is used for respectively determining whether the V sub-signal(s) comprises(comprise) new data; whether the V sub-signal(s) comprises(comprise) new data is used for determining the Q.

In one embodiment, the reference first-type radio signal is used for determining K candidate integer(s), Q1 being one of the K candidate integer(s); each of Q1 detection value(s) out of the Q detection value(s) is lower than the first threshold in the present disclosure, K being a positive integer, and the Q1 being a positive integer no greater than the Q.

In one embodiment, the processing device in the first node also comprises:

A first transmitter 1703, which transmits a third-type radio signal in the first sub-band;

herein, a start time of time-domain resources occupied by the third-type radio signal is no earlier than an end time of the Q time sub-pool(s).

In one embodiment, the first transceiver 1701 also operates first information; herein, the first information comprises scheduling information of the third-type radio signal; the operating is receiving, and the first node is a UE; or the operating is transmitting, and the first node is a base station.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:
  receiving T first-type radio signals, any first-type radio signal of the T first-type radio signals comprises control information, T being a positive integer greater than 1; and
  performing T access detections respectively on T sub-bands, and transmitting T second-type radio signals respectively in T time-frequency resource blocks, wherein the T access detections are respectively used for determining whether the T sub-bands are idle, the T second-type radio signals are respectively transmitted in the T sub-bands, and any of the T time-frequency resource blocks is earlier than Q time sub-pool(s) in time domain;
  operating first information;
  performing Q energy detection(s) respectively in the Q time sub-pool(s) on a first sub-band, through which Q detection value(s) is(are) obtained, the Q energy detection(s) is(are) used for determining whether the first sub-band is idle, Q being a positive integer; and
  transmitting a third-type radio signal in the first sub-band; wherein:
  the T sub-bands comprise at least one same frequency point, or the T sub-bands belong to a same carrier; at least one sub-band of the T sub-bands is different from the first sub-band;
  the T sub-bands and the first sub-band belong to a same carrier, and at least one of the T sub-bands is non-orthogonal with the first sub-band;
  the T first-type radio signals are respectively associated with the T second-type radio signals;
  a reference first-type radio signal is one of the T first-type radio signals, the Q is related only to the reference first-type radio signal of the T first-type radio signals;
  the T access detections are respectively used for determining transmissions of the T second-type radio signals;
  a reference sub-band is one of the T sub-bands corresponding to the reference first-type radio signal, and a reference time-frequency resource block is one of the T time-frequency resource blocks corresponding to the reference first-type radio signal;
  the reference time-frequency resource block being one of the T time-frequency resource blocks that corresponds to the reference first-type radio signal means that a reference second-type radio signal is one of the T second-type radio signals associated with the reference first-type radio signal, and the reference time-frequency resource block is a time-frequency resource block used for transmitting the reference second-type radio signal out of the T time-frequency resource blocks;
  selection of the reference time-frequency resource block is related to at least one of the first sub-band or the reference sub-band;
  the first information comprises scheduling information of the third-type radio signal;
  a start time of time-domain resources occupied by the third-type radio signal is no earlier than an end time of the Q time sub-pool(s); and
  the operating is transmitting, the first node is a base station, or, the operating is receiving, the first node is a User Equipment (UE).

2. The method according to claim 1, wherein the first node is a base station, any of the T first-type radio signals comprises Uplink control information (UCI), the T second-type radio signals are respectively transmitted on T Physical Downlink Shared CHannels (PDSCHs), and the Q energy detection(s) is(are) respectively energy detection(s) in a downlink access detection.

3. The method according to claim 1, wherein the first node is a UE, any of the T first-type radio signals comprises Downlink Control Information (DCI), the T second-type radio signals are respectively transmitted on T PUSCHs, and the Q energy detection(s) is(are) energy detection(s) in an uplink access detection.

4. The method according to claim 1, wherein a bandwidth of the reference sub-band is equal to a bandwidth of a carrier to which the reference sub-band belongs.

5. The method according to claim 1, wherein each oft time-frequency resource block(s) out of the T time-frequency resource blocks comprises the first sub-band in frequency domain, t being a positive integer no greater than the T, the reference time-frequency resource block is one of the t time-frequency resource block(s).

6. The method according to claim 5, wherein the t is greater than 1, and the reference time-frequency resource block being one of the t time-frequency resource blocks that is closest to a start time of the Q time sub-pool(s) in time domain.

7. The method according to claim 1, wherein the T first-type radio signals respectively indicate whether the T second-type radio signals are correctly received; a reference second-type radio signal is one of the T second-type radio signals associated with the reference first-type radio signal, and the reference second-type radio signal comprises W sub-signal(s), W being a positive integer; whether the W sub-signal(s) is(are) correctly received is used for determining the Q.

8. The method according to claim 7, wherein S fourth-type radio signal(s) indicates(indicate) whether S fifth-type radio signal(s) is(are) correctly received respectively, time-frequency resources respectively occupied by the S fifth-type radio signals belong to the reference time-frequency resource block, and the S fifth-type radio signal(s) comprises (comprise) W1 sub-signal(s), W1 being a positive integer; whether the W sub-signal(s) and the W1 sub-signal(s) are correctly received is used for determining the Q.

9. The method according to claim 1, wherein each of Q1 detection value(s) out of the Q detection value(s) is lower than a first threshold, K being a positive integer, and the Q1 being a positive integer no greater than the Q; the reference first-type radio signal is used for determining K candidate integer(s), Q1 being one of the K candidate integer(s).

10. The method according to claim 9, wherein the K candidate integers are 0, 1, 2..., and K−1, and the first node randomly selects a value of the Q1 from the K candidate integers.

11. A device in a first node for wireless communications, comprising:

a first transceiver, receiving T first-type radio signals, any first-type radio signal of the T first-type radio signals comprises control information, T being a positive integer greater than 1; performing T access detections respectively on T sub-bands, and transmitting T second-type radio signals respectively in T time-frequency resource blocks, wherein the T access detections are respectively used for determining whether the T sub-bands are idle, the T second-type radio signals are respectively transmitted in the T sub-bands, and any of the T time-frequency resource blocks is earlier than Q time sub-pool(s) in time domain; and operating first information;

a first receiver, performing Q energy detection(s) respectively in the Q time sub-pool(s) on a first sub-band, through which Q detection value(s) is(are) obtained, the Q energy detection(s) is(are) used for determining whether the first sub-band is idle, Q being a positive integer; and a first transmitter, transmitting a third-type radio signal in the first sub-band; wherein:

the T sub-bands comprise at least one same frequency point, or the T sub-bands belong to a same carrier;

at least one sub-band of the T sub-bands is different from the first sub-band;

the T sub-bands and the first sub-band belong to a same carrier, and at least one of the T sub-bands is non-orthogonal with the first sub-band;

the T first-type radio signals are respectively associated with the T second-type radio signals;

a reference first-type radio signal is one of the T first-type radio signals, the Q is related only to the reference first-type radio signal of the T first-type radio signals;

the T access detections are respectively used for determining transmissions of the T second-type radio signals;

a reference sub-band is one of the T sub-bands corresponding to the reference first-type radio signal, and a reference time-frequency resource block is one of the T time-frequency resource blocks corresponding to the reference first-type radio signal;

the reference time-frequency resource block being one of the T time-frequency resource blocks that corresponds to the reference first-type radio signal means that a reference second-type radio signal is one of the T second-type radio signals associated with the reference first-type radio signal, and the reference time-frequency resource block is a time-frequency resource block used for transmitting the reference second-type radio signal out of the T time-frequency resource blocks;

selection of the reference time-frequency resource block is related to at least one of the first sub-band or the reference sub-band;

the first information comprises scheduling information of the third-type radio signal;

a start time of time-domain resources occupied by the third-type radio signal is no earlier than an end time of the Q time sub-pool(s); and the operating is transmitting, the first node is a base station, or, the operating is receiving, the first node is a User Equipment (UE).

12. The device in the first node according to claim 11, wherein the first node is a base station, any of the T first-type radio signals comprises Uplink control information (UCI), the T second-type radio signals are respectively transmitted on T Physical Downlink Shared CHannels (PDSCHs), and the Q energy detection(s) is(are) respectively energy detection(s) in a downlink access detection.

13. The device in the first node according to claim 11, wherein the first node is a UE, any of the T first-type radio signals comprises Downlink Control Information (DCI), the T second-type radio signals are respectively transmitted on T PUSCHs, and the Q energy detection(s) is(are) energy detection(s) in an uplink access detection.

14. The device in the first node according to claim 11, wherein a bandwidth of the reference sub-band is equal to a bandwidth of a carrier to which the reference sub-band belongs.

15. The device in the first node according to claim 11, wherein each of t time-frequency resource block(s) out of the T time-frequency resource blocks comprises the first sub-band in frequency domain, t being a positive integer no greater than the T, the reference time-frequency resource block is one of the t time-frequency resource block(s).

16. The device in the first node according to claim 15, wherein the t is greater than 1, and the reference time-frequency resource block being one of the t time-frequency resource blocks that is closest to a start time of the Q time sub-pool(s) in time domain.

17. The device in the first node according to claim 11, wherein the T first-type radio signals respectively indicate whether the T second-type radio signals are correctly received;
- a reference second-type radio signal is one of the T second-type radio signals associated with the reference first-type radio signal, and the reference second-type radio signal comprises W sub-signal(s), W being a positive integer; whether the W sub-signal(s) is(are) correctly received is used for determining the Q.

18. The device in the first node according to claim 17, wherein S fourth-type radio signal(s) indicates(indicate) whether S fifth-type radio signal(s) is(are) correctly received respectively, time-frequency resources respectively occupied by the S fifth-type radio signals belong to the reference time-frequency resource block, and the S fifth-type radio signal(s) comprises(comprise) W1 sub-signal(s), W1 being a positive integer; whether the W sub-signal(s) and the W1 sub-signal(s) are correctly received is used for determining the Q.

19. The device in the first node according to claim 11, wherein each of Q1 detection value(s) out of the Q detection value(s) is lower than a first threshold, K being a positive integer, and the Q1 being a positive integer no greater than the Q; the reference first-type radio signal is used for determining K candidate integer(s), Q1 being one of the K candidate integer(s).

20. The device in the first node according to claim 19, wherein the K candidate integers are 0, 1, 2. . ., and K−1, and the first node randomly selects a value of the Q1 from the K candidate integers.

* * * * *